(12) United States Patent
Kairali et al.

(10) Patent No.: US 11,563,636 B1
(45) Date of Patent: Jan. 24, 2023

(54) DYNAMIC MANAGEMENT OF NETWORK POLICIES BETWEEN MICROSERVICES WITHIN A SERVICE MESH

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/671,949

(22) Filed: Feb. 15, 2022

(51) Int. Cl.
*H04L 41/0893* (2022.01)
*H04L 67/00* (2022.01)
*H04L 67/60* (2022.01)
*H04L 67/133* (2022.01)
*H04L 67/562* (2022.01)
*H04L 67/563* (2022.01)

(52) U.S. Cl.
CPC ........ *H04L 41/0893* (2013.01); *H04L 67/133* (2022.05); *H04L 67/34* (2013.01); *H04L 67/562* (2022.05); *H04L 67/563* (2022.05); *H04L 67/60* (2022.05)

(58) Field of Classification Search
CPC ... H04L 41/0893; H04L 67/133; H04L 67/34; H04L 67/562; H04L 67/563; H04L 67/60
See application file for complete search history.

(56) References Cited

U.S. PATENT DOCUMENTS

| | | | |
|---|---|---|---|
| 10,673,708 B2 | 6/2020 | Parthasarathy | |
| 10,917,316 B2 | 2/2021 | Parthasarathy | |
| 2020/0120000 A1* | 4/2020 | Parthasarathy | G06F 11/3428 |
| 2020/0120168 A1* | 4/2020 | Nainar | H04L 67/63 |
| 2020/0382388 A1* | 12/2020 | Parthasarathy | H04L 41/5051 |
| 2021/0135973 A1* | 5/2021 | Vedam | G06F 9/54 |
| 2021/0135983 A1* | 5/2021 | Farnham | H04L 45/70 |
| 2022/0006854 A1* | 1/2022 | Hulick, Jr. | G06N 5/043 |

(Continued)

OTHER PUBLICATIONS

"Designing a Microservices Architecture for Failure", RisingStack Engineering, Sep. 13, 2021, 16 pages, <https://blog.risingstack.com/designing-microservices-architecture-for-failure/>.

(Continued)

*Primary Examiner* — Brian J. Gillis
*Assistant Examiner* — Thao D Duong
(74) *Attorney, Agent, or Firm* — Christopher M. Pignato

(57) ABSTRACT

Systems, methods and/or computer program products optimizing network policies between microservices of a service mesh. The service mesh tracks incoming API calls of applications and based on the historical transactions, the context of API calls, and the microservices in the microservice chain being invoked, network controls and policy configurations are set to optimize the transactions performed by the service mesh. Dimensions of the communications between microservices of the service mesh are dynamically optimized via the service mesh control plane using a policy optimizer. Optimized dimensions of service mesh transactions includes automated policy adjustments to retries between microservices, circuit breaking between microservices, automated timeout adjustments between microservices and intelligent rate limiting between microservices and/or rate limiting applied to user profiles.

20 Claims, 10 Drawing Sheets

(56) References Cited

U.S. PATENT DOCUMENTS

| 2022/0012332 | A1* | 1/2022 | Dürr | H04L 63/1458 |
| 2022/0046084 | A1* | 2/2022 | Nair | G06F 9/5077 |
| 2022/0070279 | A1* | 3/2022 | Pang | H04L 63/0428 |
| 2022/0116289 | A1* | 4/2022 | Ramanathan | H04L 12/12 |
| 2022/0141304 | A1* | 5/2022 | Gefen | H04L 67/567 |
| | | | | 709/219 |

OTHER PUBLICATIONS

"Designing interservice communication for microservices", Microsoft Docs, May 23, 2019, 10 pages, <https://docs.microsoft.com/en-us/azure/architecture/microservices/design/interservice-communication>.

Addeen, Hajar Hameed, "A Dynamic Fault Tolerance Model for Microservices Architecture", Open PRAIRIE: Open Public Research Access Institutional Repository and Information Exchange, 2019, 59 pages.

Blogumas, TJ, "Building Resilient Microservices with Circuit Breakers", Medium, Apr. 21, 2020, 5 pages, <https://medium.com/devops-dudes/building-resilient-microservices-with-circuit-breakers-193719f47367>.

Gajda, Kim, "Prevent system failure with the Circuit Breaker pattern", IBM, downloaded from the Internet on Sep. 21, 2021, 4 pages, <https://www.ibm.com/garage/method/practices/manage/practice_circuit_breaker_pattern/>.

Mell et al., "The NIST Definition of Cloud Computing", Recommendations of the National Institute of Standards and Technology, Special Publication 800-145, Sep. 2011, 7 pages.

\* cited by examiner

DYNAMIC MANAGEMENT OF NETWORK POLICIES BETWEEN MICROSERVICES WITHIN A SERVICE MESH

BACKGROUND

The present disclosure relates generally to the field of microservice architecture, and more specifically to service meshes and techniques for managing communications and network policies between the microservices of a service mesh.

Modern applications are often broken down into this microservice architecture, whereby a loosely coupled and independent network of smaller services each perform a specific business function. The microservices architecture lets developers make changes to an application's services without the need for a full redeploy. Microservices are built independently, communicate with each other, and can individually fail without escalating into an application-wide outage. The microservices communicate via a defined interface using lightweight API's. Because microservices run independently of each other, each service can be updated, deployed and scaled to meet demand for specific functions of an application. In order to execute microservice functions, one service might need to request data from several other services. A service mesh provides a way to control how different parts of an application share data with one another. The service mesh is a dedicated infrastructure layer built right into an application. This visible infrastructure layer can document how well different parts of an application interact with one another, making it easier to optimize communication and avoid downtime as an application grows and changes over time. Each part microservice of the application can rely on other microservices to complete transactions, tasks or other functions requested by users.

The service mesh routes requests from one service to the next, optimizing how all the moving parts of the network of microservices work together. The service mesh takes the logic governing service-to-service communication out of individual services and abstracts the logic to the layer of infrastructure. Requests are routed between microservices of the service mesh through proxies in the infrastructure layer; sometimes individually referred to as "sidecars" because the proxies run alongside each service rather than within the service. Taken together, the "sidecar" proxies decoupled from each service form the mesh network. Within complex microservice architectures, locating problems can be nearly impossible without a service mesh. The service mesh is able to capture aspects of service-to-service communication as performance metrics. Over time, data made visible by the service mesh can be applied to the rules for interservice communication, resulting in more efficient and reliable service requests.

SUMMARY

Embodiments of the present disclosure relate to a computer-implemented method, an associated computer system and computer program products for managing network policies between microservices within a service mesh. A first embodiment of the computer-implemented method comprising: collecting, by the service mesh, a history of API calls sent to the service mesh, including within the history of the API calls, a number of retries between microservices of each microservice chain invoked by the API calls; tracking, by the service mesh, the number of retries between the micro services for each user profile transmitting one or more of the API calls, based on the history of the API calls to the service mesh; receiving, by the service mesh, an incoming API call requesting the microservices of the service mesh, wherein the incoming API call is routed through a microservice chain comprising a first microservice to a second microservice; comparing, by the service mesh, a current retry count for communications between the first microservice and the second microservice with a historical success rate recorded by the history of the API calls for the first microservice and the second microservice at the current retry count; upon identifying, by the service mesh, that the historical success rate at the current retry count is below a threshold level of success, automatically adjusting the current retry count for communications between the first microservice and the second microservice to increase the number of retries to a retry count predicted to increase a success rate above the threshold level of success; and pushing, by the service mesh, a network policy changing the current retry count to an adjusted retry count, to a proxy of the first microservice and a proxy of the second microservice.

A second embodiment of the computer-implemented method for managing network policies between microservices within a service mesh comprising: collecting, by the service mesh, a history of API calls sent to the service mesh, including within the history of the API calls, circuit breaking events between microservices of each microservice chain invoked by the API calls; tracking, by the service mesh, the circuit breaking events between the microservices for each user profile transmitting one or more of the API calls, based on the history of the API calls to the service mesh; receiving, by the service mesh, an incoming API call requesting the microservices of the service mesh, wherein the incoming API call is routed through a microservice chain comprising a first microservice to a second microservice; predicting, by the service mesh, whether the incoming API call will be routed between the first microservice and the second microservice, and based on the history of API calls, whether the incoming API call being routed from the first microservice to the second microservice will break a circuit in the microservice chain; and upon predicting that routing the incoming API call through the first microservice to the second microservice will break the circuit in the microservice chain, preemptively breaking, by the service mesh, the circuit in the microservice chain at a third microservice upstream from the first microservice and the second microservice.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
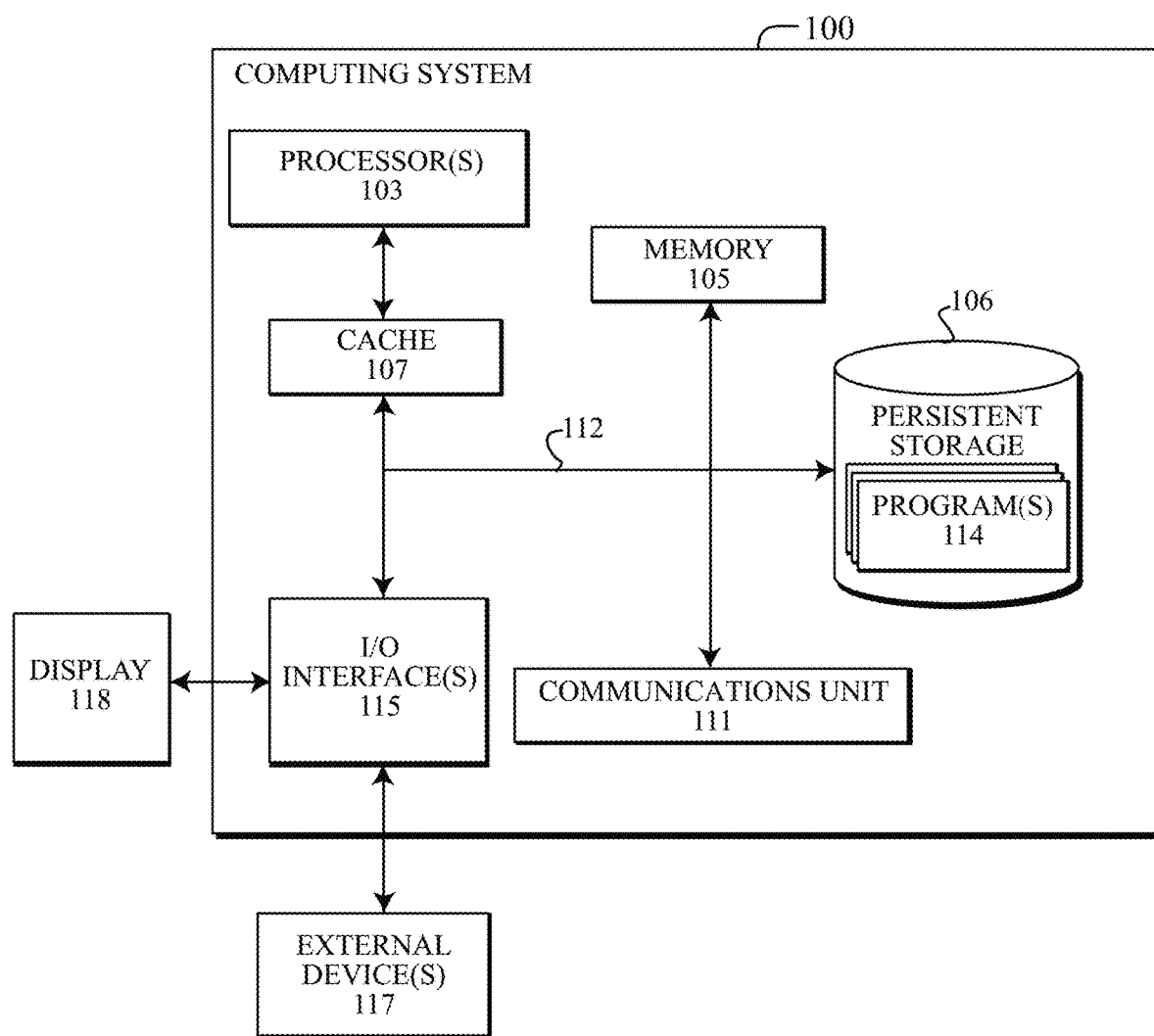
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

As systems supporting legacy services are updated or converted to architectures that support a microservice philosophy, new challenges for managing the microservices have arisen over time. A service mesh architecture comprising a plurality of microservices can be heavily used in cloud-based application development, especially when there are numerous services and microservices involved. When a call for microservices occurs, the actual call occurs between the proxies of the microservices. It is the proxy for the microservice that can control the various networking parameters; for example, automatic retries, circuit breakers, timeout controls and rate-limiting between the microservices of a microservice chain. In various situational contexts, failure of any microservice within a microservice chain may cause additional repetition of a transactional activity, or if any function has failed (even after partially processing) then the microservice has to restart processing from the beginning. Embodiments of the present disclosure recognize that dynamically adjusting network policies and network controls being implemented the proxies of the microservice chain, improves the efficiency of the service mesh to complete transactions being called by the APIs of an application. More specifically, dynamically adjusting and re-configuring the network controls and policies being pushed to the proxies improves the efficiency of partially completed transactions. For example, by setting the number of retries or reducing the polling interval between each retry; a transactional activity being performed by the microservice chain may be more likely to complete and/or complete faster after a plurality of retries, rather than having an API call fail part-way during processing at a microservice, return a failure notification and have to be re-executed as a new API call.

Embodiments of the present disclosure optimizes network policies and configurations of the service mesh by observing and tracking the context of transactions occurring on the service mesh. In particular, the contextual activity is observed by the service mesh control plane using historically collected metrics describing transactions and calls executed at the request of users and/or external services within the service mesh. A policy optimizer deployed by the service mesh's control plane is able to track all of the network controls and configurations at the time API calls are executed, calculates optimized policies using historical context from previous transactions executed using similar controls and configurations, then adjusting the configurations and controls to improve the likelihood of transactional success, improve rate of transactions being completed and/or reduce and eliminate known impediments that may be blocking transactional success. The policy optimizer pushes the updated network policies and configurations to the proxies (i.e., sidecar) of the microservices within the service mesh and keeps the proxies up to date with network policies as service mesh environment changes over time (i.e., increased loads, changes in resources, microservices are unreachable, etc.). The optimized network controls that can be modulated by the policy optimizer may include (but are not limited to) the automated retries between microservices within the service mesh, automated circuit breaking between microservices in a microservice chain invoked within the service mesh, automated timeout adjustments between microservices within the service mesh and automated rate-limiting adjustments between the microservices of the service mesh.

Computing System

The present invention may be a system, a method, and/or a computer program product at any possible technical detail level of integration. The computer program product may include a computer-readable storage medium (or media)

having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
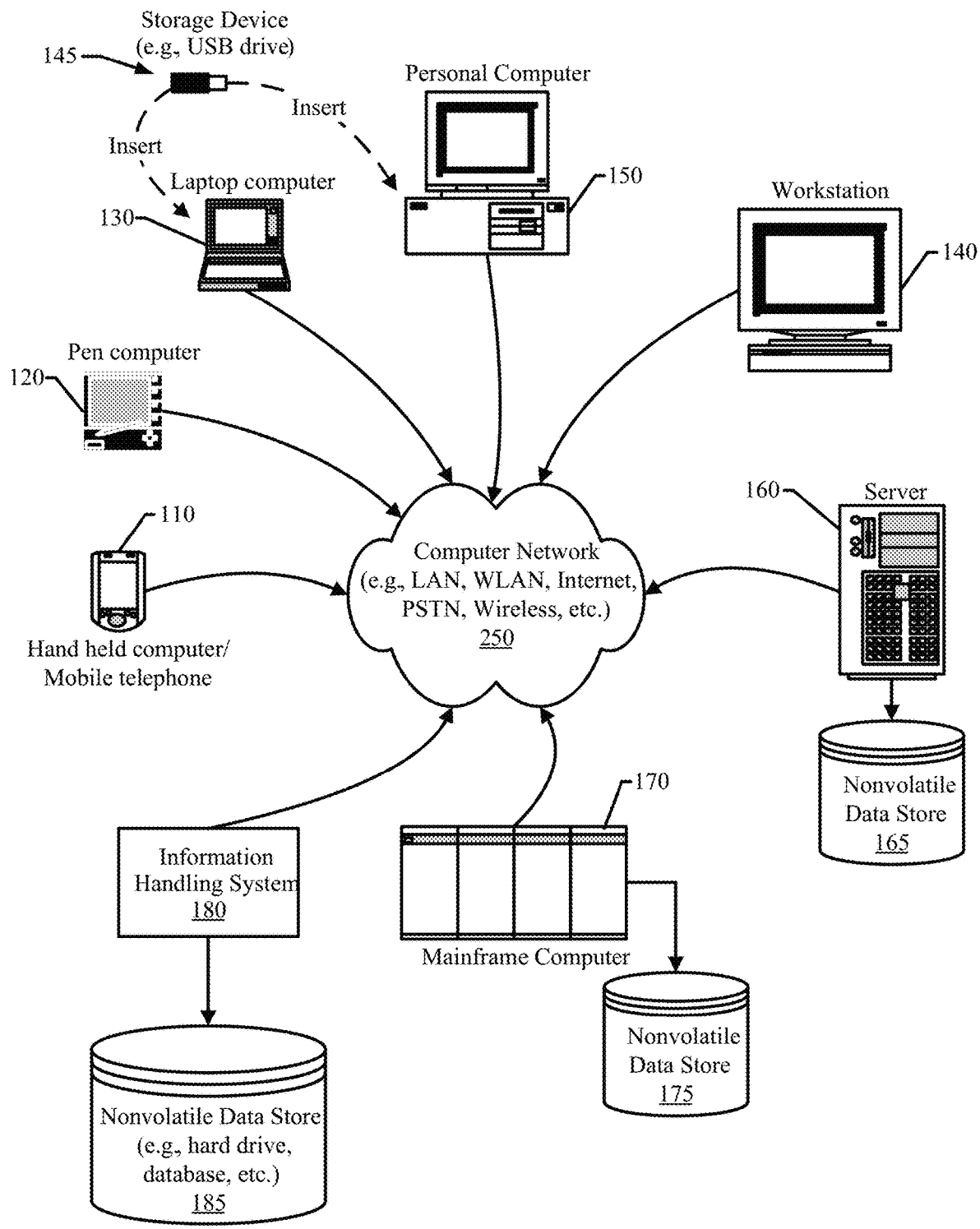
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
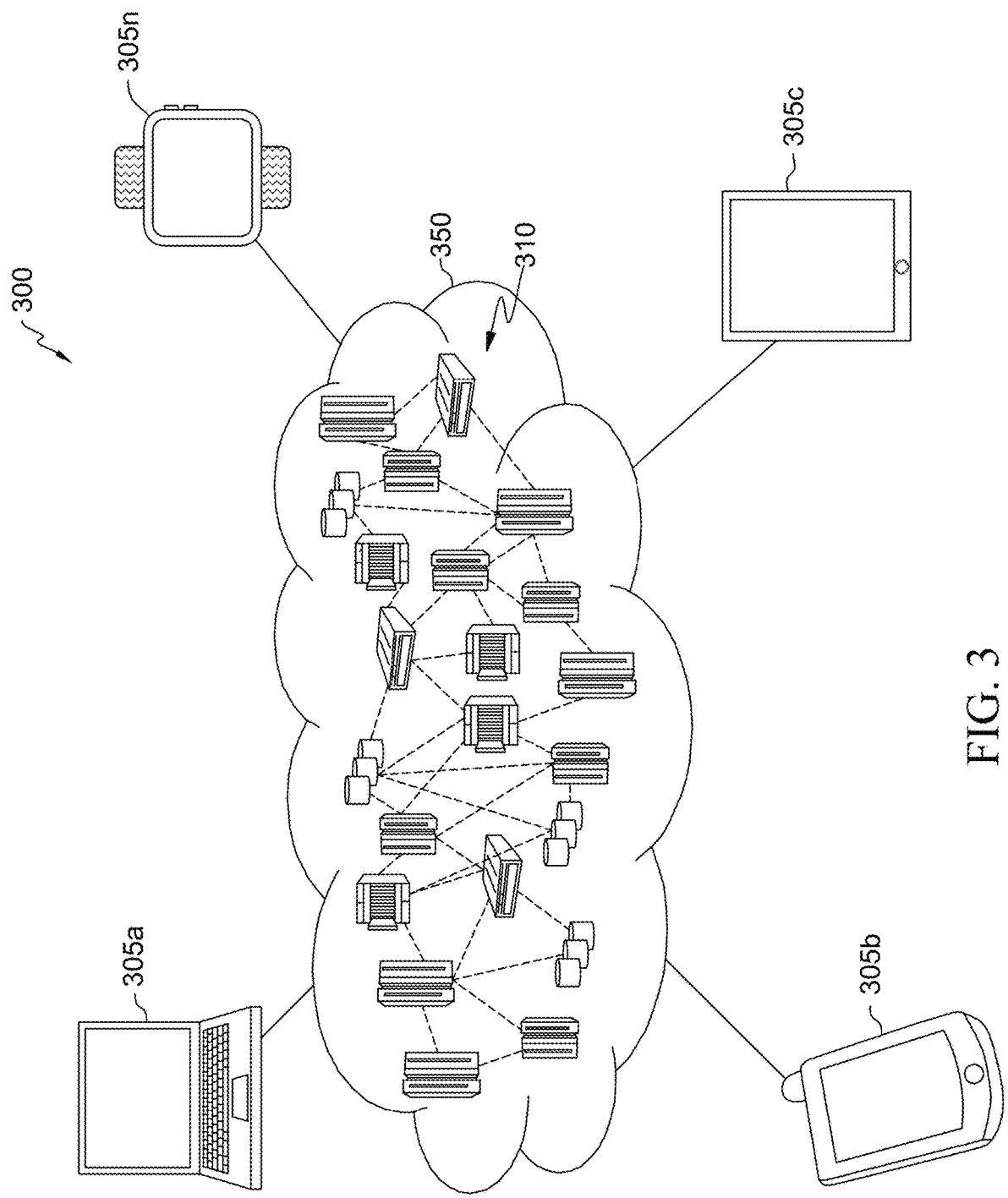
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305*a*, smartphone 305*b* or cellular telephone, tablet computers 305*c* and smart devices such as a smartwatch 305*n* and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
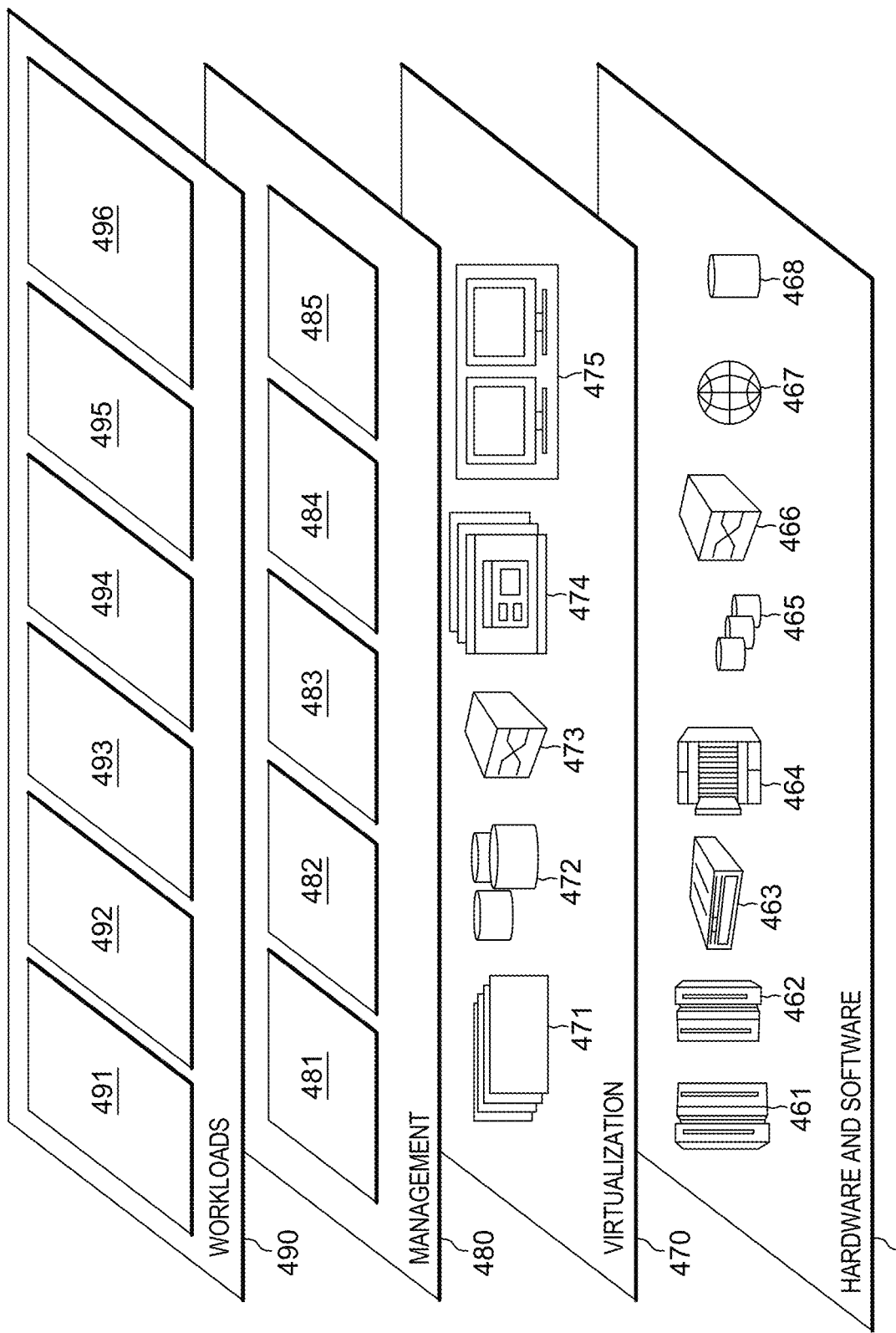
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and video conferencing 496.

System for Managing and Optimizing Network Policies Between Microservices within a Service Mesh It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/ or two-way communication even if the depicted connection is a one-way or two-way arrow. Also, any device depicted in the drawings can be a different device. For example, if a mobile device is shown sending information, a wired device could also be used to send the information.

Figure 5:
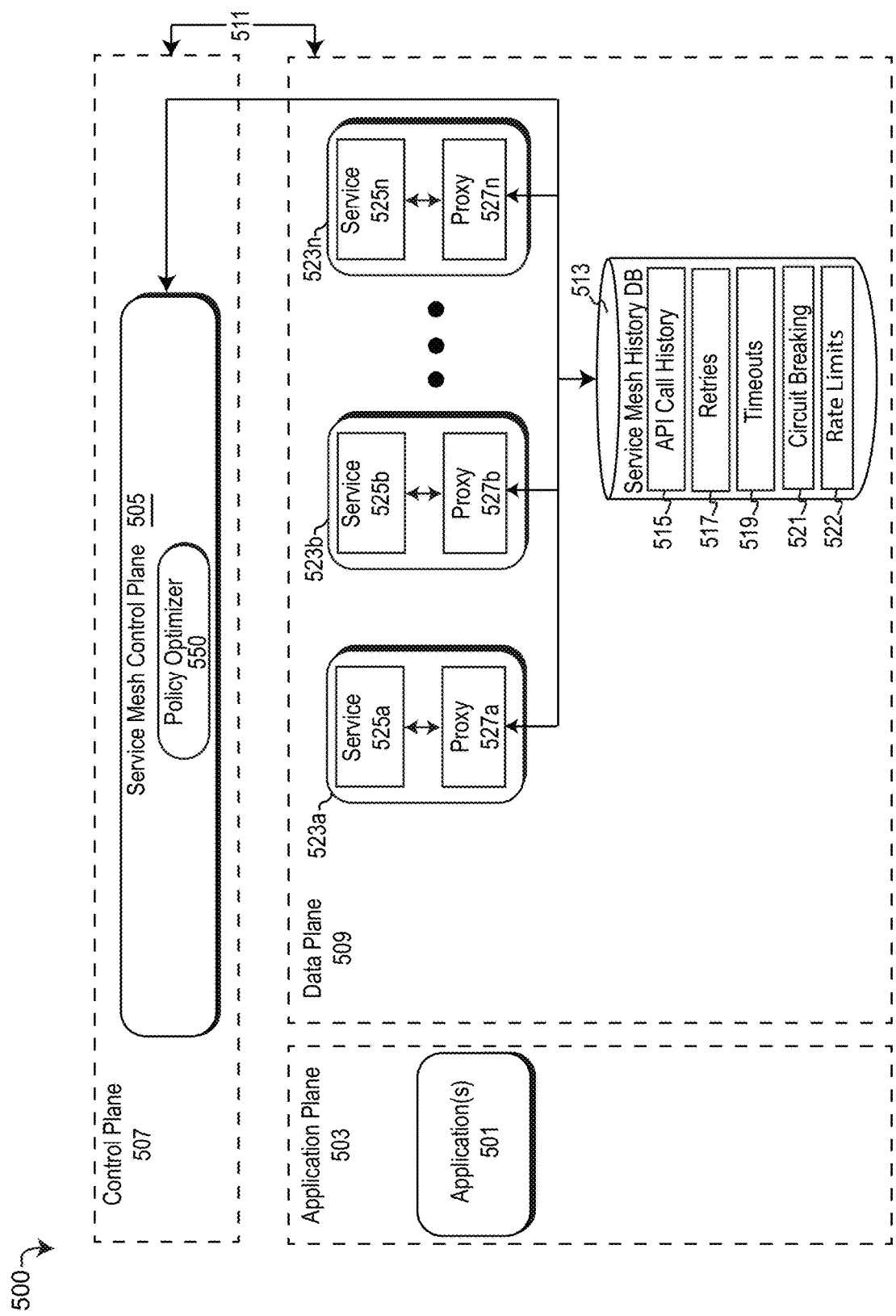
FIG. 5 depicts a functional block diagram describing an embodiment of a service mesh computing environment for dynamically managing and optimizing network policies between microservices of a service mesh, in accordance with the present disclosure.

Referring to the drawings, FIG. 5 depicts an embodiment of a computing environment 500 illustrating a microservice architecture that can be executed on one or more computing systems 100 and variations thereof. As illustrated in the embodiment of the computing environment 500, a plurality of planes (or layers) of the environment 500 are placed in communication with one another. As depicted, the computing environment 500 includes (but is not limited to) an application plane 503 comprising one or more application(s) 501, a control plane 507 and a data plane 509.

Figure 6:
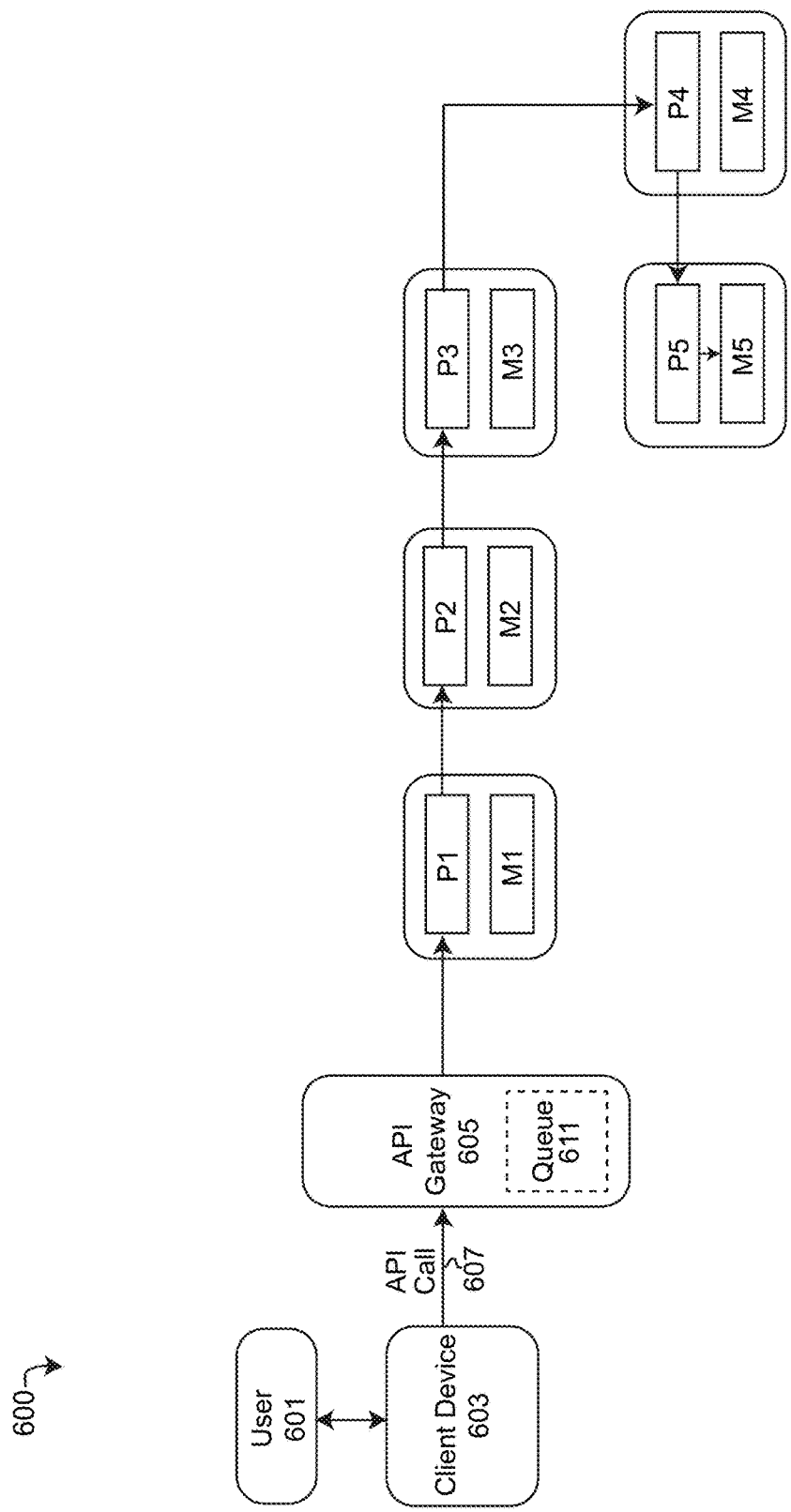
FIG. 6 depicts a workflow diagram describing an embodiment of a service mesh receiving one or more API call and invoking an example of a microservice chain.

Embodiments of the application plane 503 may be the layer of the network comprising one or more application(s) 501 that may make requests for network functions provided by the control plane 507 and/or data plane 509. The combination of the control plane 507 and the data plane 509 make up the service mesh 511. Users accessing the applications 501 of the application plane 503 may input the requests for services and/or functions of the service mesh 511 network by interacting with a user interface (UI) of the application 501. For example, an application UI displayed by an end user device or client device. Embodiments of end user devices or client devices may request the services or functions from the other planes of the service mesh 511 by inputting or transmitting one or more calls from an interface of application(s) 501 to the service mesh 511. More specifically, API calls may request the execution of one or more capabilities or functions of the microservices 525*a*-525*n* (generally referred to herein as microservices 525 or services 525). Embodiments of the application UI transmitting requests may be part a mobile application, web application, SaaS application, etc. For example, mobile applications may be inputting requests and routing data through the service mesh 511 by transmitting an API call 607 to an API gateway 605 of the network, as shown in FIG. 6. In other examples, client devices may use a command line interface (CLI) to input commands and requests to the service mesh 511 and/or a web-based UI transmitting an HTTP request via a web browser. Transaction requests to one or more microservices 525 of an application 501 may be initiated by external user(s), and/or external services incoming from outside of service mesh 511 network.

Referring now to the data plane 509, embodiments of the data plane 509 may be responsible for touching every packet of data and/or incoming call requesting services from the service mesh 511. In other words, the data plane 509 of the service mesh 511 may be responsible for conditionally translating, forwarding, and observing every network packet that flows to and from the instances 523a-523n (hereinafter referred to generally as instances 523) of services 525 (and replicas thereof) and/or proxies 527a-527n (hereinafter proxies 527) within the service mesh 511. As illustrated in the exemplary embodiment of FIG. 5, the data plane 509 may comprise a plurality of instances 523, which can be in the form of one or more clusters, pods, or containers hosting a service 525 within the instance 523. Embodiments of each service 525 may be co-located within an instance 523 with a sidecar network proxy 527 injected into the instance 523. For example, as shown in FIG. 5, service 525a is co-located with proxy 527a within instance 523a; service 525b is co-located with proxy 527b within instance 523b; and service 523n is co-located with proxy 527n within instance 523n of the data plane 509. Network traffic (e.g., HTTP, REST, gRPC, Redis, etc.) being routed along microservice chains comprising more than one individual microservice 525 may flow via the local proxies 527 to a destination routed by the service mesh 511, in accordance with the routing rules and policies of the service mesh 511. Since the data flows from the services 525 to the co-located proxy 527, the services 525 may not be aware of the network of services at large that may form the data plane 209. Instead, the services 525 themselves may only be aware of their local proxy 527.

Embodiments of the proxies 527 may be responsible for performing tasks associated with service discovery, health checking, routing, load balancing, authentication/authorization, and observability. Service discovery tasks may include discovery of upstream and/or backend services 525 and instances 523 thereof that are available on the data plane 509 of the service mesh 511. Health checking tasks may include determining whether upstream services 525 and instances 523 thereof returned by service discovery are healthy and ready to accept network traffic. Health checking may include both active health checking and/or passive health checking.

Routing tasks of the proxies 527 may include directing requests to a proper instance 523, such as a cluster, pod or container of a service 525. For example, a REST request for a local instance 523a of a service 525a, a proxy 527a tasked with sending an outbound communication to the next service 525b of a microservice chain knows where to send the communication, such as API calls, according to the routing rules and configurations of the service mesh 511. Authentication and authorization tasks of the proxies 527 may include the performance of cryptographic attestation of incoming requests in order to determine if the request being invoked by an API call is valid and allowable. For example, the user sending the requested call is authenticated the proxy 527 using Mutual Transport Layer Security (mTLS) or another mechanism of authentication, and if the user is allowed to invoke the requested endpoint service of the service mesh 511, the proxy 527 may route the request to the next service 525 along the microservice chain. Otherwise, the proxy 527 can return a response to an external user or external service indicating that the requester is not authorized to invoke a particular call function and/or a user is not authenticated by the service mesh 511.

Embodiments of the proxies 527 may perform one or more observability tasks of the service mesh 511 since API calls can occur between proxies 527 of the microservice chain being invoked. Moreover, the proxies 527 can control network functions, including automatic retries, circuit breakers, timeout controls and rate limiting between microservices 525. The observability tasks may include, for each API call, collecting detailed metrics about the service mesh 511, including statistics about API call histories 515 for each user and the service mesh 511 as a whole such as the type of call and data involved, which user profile executed the call, the success or failure of the call, which microservice chains were invoked, the time the call was placed, etc. Moreover, additional information collected as part of observability tasks may include the number of retries 517 or timeouts while routing the API call through a microservice chain, at which microservices a failure occurred resulting in a retry or timeout, circuit breaking that may occur between microservices 525 of a microservice chain invoked by an API call being observed and any rate limits being enforced on one or more microservices 525 fulfilling requests of the API call. Observability tasks may also include generation of distributed tracing data that may allow operators and administrators of the service mesh 511 to understand the distributed traffic flow of the service mesh 511. Embodiments of the service mesh 511 may keep track of all possible services 525 being invoked by users and may track the functions or capabilities of services 525 being invoked on a per user basis then store the data associated with the user's invoked services 525 to profiles associated with the users (i.e., user profiles).

Over time, the service mesh 511 may build a heuristics database comprising historical data metrics collected by the proxies 527 as requested calls are made and fulfilled by the service mesh 511. Embodiments of the service mesh 511 can use the collected metrics to keep track of all API calls being made to the service mesh 511, and the track the effect of one or more configurations or settings on the success or failure of API calls. For example, by optimizing network policies to set retries, timeouts, circuit breaking, rate limits, etc., in such a manner that maximizes successful API calls and/or reduces the amount of computing resources wasted on fulfilling failed API calls. The collected metrics stored by the heuristics database may be a source of information for tracking optimal settings or configurations of the service mesh 511 network, help predict how each type of API call may be fulfilled, the expected success of the API call based on historically used microservice chains and for identify useful patterns associated with the different API calls received by the service mesh 511.

In the exemplary embodiment of FIG. 5, the heuristics database collecting metrics of the service mesh 511 for each user profile or user ID, may be referred to as service mesh history database 513 (abbreviated service mesh history DB 513). Proxies 527 of the service mesh 511 may collect and store a plurality of different metrics to the service mesh history DB 513 over time, along with user profiles associated with the metrics being collected. For example, the historical data being collected by the service mesh 511 may be represented by the API call history 515 (including the type of API call being made), the number of retries 517 to successfully complete an API call, timeouts 519 or other types of errors, warnings and failures that are occurring from the API calls, time stamps for certain events occurring on the service mesh, including security events, timeout 519 events between microservices 525, circuit breaking 521 events between microservices 525. Furthermore, the service mesh history DB 513 may store and calculate API call rates generally and/or API call rates at specific times of day, as well as rate limits applied to one or microservices 525 of a microservice chain wherein a microservice 525 may be limited to fulfilling a number of API calls per unit of time. For example, a microservice could be rate limited to fulfilling twenty-five API calls per second, 100 API calls per min, etc.

Embodiments of the control plane 507 of the service mesh 511, may configure the data plane 509 based on a declared or desired state of the service mesh 511. The control plane 507 may be the portion or part of a network responsible for controlling how data packets are forwarded from a first location of the network to a destination of the network, and the route the data will take to arrive at a destination. Control plane 507 may be responsible for creating a routing table, routing rules, and implementing various protocols to identify the network paths that may be used by the network. The control plane 207 can store the network paths to the routing table. Examples of protocols used for creating routing tables may include Border Gateway Protocol (BGP), Open Shortest Path First (OSPF), and/or Intermediate System to Intermediate System (IS-IS).

Embodiments of the control plane 507 may include a service mesh control plane 505, which may turn all the data planes 509 into a distributed system. The service mesh control plane 505 may provide the rules, policies and/or configurations enacted for each of the running data planes 509 of a service mesh 511, but the service mesh control plane 595 does not touch any packets or requests transmitted by the external user(s) or external service making API calls. For example, service mesh control plane 505 may utilize the service mesh metrics collected from the proxies 527 and/or micro services 525 of the service mesh 511 to track all API calls between microservices of the service mesh 511. The service mesh control plane 505 can configure network policies that can be pushed to the proxies 527 and in doing so may control: communications between the microservices 525 of invoked microservice chains; the fulfillment API calls; and/or the ability of specific users to utilize the services the service mesh 511. The service mesh 511 may be initially configured by a human administrator interacting with the service mesh control plane 505 via a UI to control the distributed system of the service mesh 511. For example, the administrator may interact with the service mesh control plane 505 through a web portal, CLI or some other interface. Through the UI, the operator or administrator may access global system configurations for the service mesh 511, including but not limited to, deployment control, authentication and authorization settings, route table specifications, initial application logging settings and load balancer settings such as timeouts, retries, circuit breakers, etc.

Embodiments of the service mesh control plane 505, may further include additional components that configure the service mesh 511. For example, in some embodiments, the service mesh control plane 505 may further configure a workload scheduler, service discovery and sidecar proxy configuration APIs. The services 525 may run on infrastructure via a scheduling system (e.g., Kubernetes®), and the workload scheduler may be responsible for bootstrapping a service 525 along with a sidecar or proxy 527. As the workload scheduler starts and stops instances 523 of the services 525, the service discovery component may report the state of services 525 and may be the process responsible for automatically finding instances 523 of services 525 to fulfill requests of incoming API calls. Embodiments of sidecar proxy configuration APIs may describe the configuration of the proxies 527 mediating inbound and outbound communication to the service 525 attached to the proxies 527. During configuration of the proxies 527, all proxies 527 may be programmed in the service mesh 511 with configuration settings that may allow the proxies 527 to reach every instance 523 and service 525 of the service mesh 511. Moreover, the sidecar proxy configuration APIs may configure the proxies 527 to accept traffic on all ports associated with a service 525. Furthermore, through the sidecar proxy configuration APIs, the service mesh control plane 505 may fine tune the set of ports, and protocols that a proxy 527 may accept when forwarding traffic to and from an instance 523 and services 525. Additionally, through the sidecar proxy configuration APIs, the service mesh control plane 505 may restrict a set of services 525 that a proxy 527 may reach when forwarding outbound traffic from a service 525 or instance 523.

Embodiments of the service mesh control plane 505 may deploy a policy optimizer 550 to perform functions or tasks associated with tracking network controls, calculating optimized network policies that incorporated the configurations of the network controls and pushing the configurations of the optimized network policies to one or more proxy 527 of the service mesh 511. For example, embodiments of policy optimizer 550 may optimize network policies of the service mesh by tracking and modifying network controls to automate the number of retries between microservices 525 of a service mesh 511, automate circuit breaking between microservices 525 in a microservice chain of the service mesh 511, automate timeout adjustments between microservices 525 within the service mesh 511 and/or automate rate limiting adjustments between microservices 525 of the service mesh 511.

Embodiments of the policy optimizer 550 may intelligently automate retries between microservices 525 of the service mesh 511. Policy optimizer 550 of the service mesh control plane 505 uses the historical information collected by the service mesh history DB 513 and/or other data sources connected to the service mesh 511 to track various retries 517 and retry attempts made between microservices 525 and/or proxies 527 thereof while executing an API call as part of a microservice chain. Network policies configuring a retry count between specific microservices 525 of various microservice chains may be initially configured manually by an administrator of the service mesh 511, set to a default retry count, or may have been automatically configured intelligently using a mean or median retry count observed by the service mesh 511 to most frequently succeed when attempting to communicate between microservices 525. The configuration of the retry count in the network policies of the service mesh 511 may be automatically adjusted by the policy optimizer 550 if the policy optimizer observes (as a function of tracking retries 517) that the current retry count set by a current network policy results in a degree of completeness that is worse than a threshold level acceptable to the service mesh 511 for any particular API call attempting to be fulfilled, the retry count can be automatically increased by the policy optimizer 550 in an effort to give microservices 525 additional opportunities to conduct more retries and ultimately succeed in performing the API call. In other words, policy optimizer 550 observes that a certain API call is failing at a rate that is higher than the threshold level after conducting the number of retries prescribed by the retry count in the network policy for the specified API call and therefore increases the retry count prescribed by the network policy and pushes the updated network policy to proxies 527.

Using the embodiment of FIG. 6 as an example, an incoming API call 607 invokes a microservice chain M1 to M5. If the retry count between M1 and M2 is set by the network policy to conduct 25 retries for a specific API call and the service mesh's threshold level of failure for API call 607 is a 75% failure rate, then if the policy optimizer 550 tracks a failure rate of 90% at M1 to M2 for API call 607, policy optimizer 550 will re-configure the retry count set by the network policy to greater than 25 retries in an effort to reduce the failure rate from 90% for the API call down to less than the 75% threshold failure rate. The updated configuration for the retry count may be saved as part of an updated network policy and the policy optimizer 550 of the service mesh control plane 505 may push the updated network policy to one or more of the proxies of the microservice chain. For instance, in the case of this example, proxies P1 to P5 may receive the updated network policy comprising the updated retry count configuration.

In some embodiments, the policy optimizer 550 may not only automate the retry count between microservices 525 of the service mesh 511 but may also automatically adjust the configuration of a polling interval between the retries. The polling interval may be described as the amount of time a proxy may wait before attempting to retry the API call. Embodiments of the policy optimizer 550 may configure the network policy by reducing the polling interval (i.e., reducing the amount of time between retries of the API call) in situations where a certain number of retries (N retries) always occurs before a successful API call is completed. As such, the number of retries needed to complete the API call is reached more quickly. Using the microservice chain shown in FIG. 6 as an example, A user 601 submits an API call 607 via client device 603 to the service mesh 511 and invokes microservice chain M1 to M5 as shown. If the policy optimizer 550 observes, based on the historical metrics collected by the service mesh history DB 513 and/or as a function of tracking retries by the service mesh control plane 505, that a successful API call 607 between M1 to M2 takes at least 20 retries to complete the API call, policy optimizer 550 may reduce the amount of time it takes to reach the 20$^{th}$ retry by reducing the polling interval between each retry attempt.

Embodiments of policy optimizer 550 can further impart network controls on retries between microservices 525 of the service mesh 511 by identifying underlying issues that may need to be resolved before a retry will be successful at completing an API call. For instance, in some embodiments, policy optimizer 550 may check the health, readiness and availability of one or more microservices 525 in a microservice chain being invoked by an API call. If the policy optimizer 550 observes one or more microservices as being unready or unavailable (for example due to an outage of the microservice 525) to perform an API call, policy optimizer 550 may pause or suspend all retries from being performed on a particular microservice chain until the unready or unavailable microservice becomes ready and/or available to complete the API call. Policy optimizer 550 may configure the network policy of the service mesh 511 to pause retries on microservice chains comprising the microservice 525 that may be causing the outage and push the updated network policies to proxies 527 of the microservice chain(s) where the unavailable microservice 525 is part of the chain.

In some embodiments of the service mesh 511, the policy optimizer 550 may analyze and/or calculate the number of retry attempts that may be pending with microservices 525 of a microservice chain as a result of a pause in retry attempts due to a microservice outage. Based on the predicted number of pending retry attempts that may be expected, policy optimizer 550 may recognize when the number of predicted retry attempts are expected to create a heavy load on the microservice chain(s) of the service mesh 511 upon a microservice experiencing an outage becomes available again. In order to avoid a sudden influx of retry attempts from occurring simultaneously, policy optimizer 550 may minimize the increase in load from the influx of retries by enabling a queue 611 and/or scaling up microservices 525 to address the potential increased load from the incoming retry attempts. For example, in some embodiments, the policy optimizer 550 may deploy queue 611 as part of the API gateway 605. As retry attempts for API calls 607 are sent to the API gateway 605 during the microservice outage, the API call messages can be placed in the queue 611. Upon the microservice 525 becoming operational again, the queued retry attempts can be released from the queue 611 in a controlled manner and routed through the appropriate microservice chain(s), instead of allowing a mass influx of API calls 607 to be routed all at once to the microservice chains. Furthermore, in some embodiments, either separately, or in conjunction with queue 611, the service mesh control plane 505 may scale up one or more microservices 525 of the microservice chain(s) expected to receive an increased load of retries to execute one or more API calls 607. Scaling up microservices 525 may include replicating one or more microservices 525 in order to distribute and handle the increased load of retries and/or increasing the number of resources provisioned to the microservices 525 of the microservice chains expected to receive an increased load of API calls following the microservice outage.

Embodiments of the policy optimizer 550 may intelligently automate circuit breaking actions occurring between microservices 525 of a microservice chain. Service mesh control plane 505 can use the data collected by the service mesh history DB 513 to track all API calls between microservices 525 resulting in a circuit breaking events 521. In view of the service mesh control plane 505 being aware of circuit breaking events 521 between microservices, which microservice chains are known to be used for specific API calls the service mesh control plane 505 can predict whether an API initiated by a particular user profile or UserID call might cause circuit breaking to occur. If, based on a trajectory of known user profiles, and API call history 515 that an incoming API call is expected to be route between two microservices 525 that are known to cause a circuit breaking event, the service mesh control plane 505 may engage the policy optimizer 550 to pre-emptively break the circuit of the microservice chain at a microservice upstream (i.e., earlier in the chain) than the microservices 525 known to result in a circuit breaking event, if such a prediction can be made with reasonable accuracy and/or at a high enough confidence interval.

For example, user 601 initiates an API call 607 to a service mesh 511 and the API call 607 invokes a microservice chain as shown in FIG. 6 comprising microservices M1 to M5. If the service mesh control plane 505 knows that circuit breaking events on the specific API call 607 coming in or even any call generally, result in a circuit breaking event between M4 and M5, policy optimizer may pre-emptively break the circuitry of the microservice chain M1 to M5 at a microservice upstream from M4, such as M1, M2, or M3. Furthermore, in some embodiments, policy optimizer

550 may check the readiness of the microservice chain's endpoint microservice and if the endpoint microservice is unavailable, the policy optimizer can block the microservice chain at the first microservice 525 of the microservice chain. For instance, if M5 of the microservice chain M1 to M5 is unavailable, policy optimizer 550 may block the incoming API call 607 from executing the call at the beginning of the microservice chain, which in this example is M1, thus saving unnecessary resource usage by preventing additional routing to the other microservices 525 and proxies 527 thereof of the microservice chain.

Embodiments of the policy optimizer 550 may recognize that upon pre-emptively blocking API calls from executing on a microservice chain that has a microservice endpoint that is unavailable due to an outage, a heavy load may be experienced by the microservice chain once the microservice endpoint is restored and retry attempts are performed. In order to prevent retry attempts from creating a heavy load by executing at the same time or near simultaneously, embodiments of the policy optimizer 550 may enable queue 611 as discussed above and/or scale up one or more microservices to handle the incoming API calls once the retries resume. For example, if endpoint microservice M5 is experiencing an outage and policy optimizer 550 has blocked all API calls 607 at M1, the policy optimizer 550 may deploy a queue 611 to control the number of API calls 607 being retried at once when M5 is operational again and/service mesh control plane 505 may scale up M5 to handle the expected increase in retry attempts, once M5 is available.

Embodiments of policy optimizer 550 may automate timeout adjustments between microservices 525 within a service mesh 511. Service mesh control plane 505 may continuously track timeout configurations 519 alongside the timeouts occurring for each API call being executed by microservice chains of the service mesh 511. Policy optimizer 550 can increase or decrease timeout values within the timeout configurations established by the network policies based on threshold levels configured by the service mesh 511 and/or administrators of the service mesh 511 (such as a cloud administrator). In some embodiments, two different threshold levels may be set, a first timeout threshold level for decreasing a timeout value within a timeout configuration and a second timeout threshold for increasing the timeout value. For instance, if the service mesh control plane 505 observes that the degree of timeouts occurring for a particular API call executed on a microservice chain or globally across the service mesh 511 a below a first threshold level at the current timeout configuration, the policy optimizer 550 may decrease the timeout value, allowing API calls that are not being responded to prior to the timeout value being reached to timeout faster. Likewise, if the degree of timeout transactions is above a maximum threshold, the policy optimizer can increase the timeout value, allowing more time for the API calls to complete before a timeout occurs.

For example, using the microservice chain M1 to M5 of FIG. 6, if between microservices M1 to M2 a timeout configuration exists as part of a network policy pushed to the proxies P1 and P2, and threshold level is set to a 2% timeout transaction rate. If upon tracking the timeouts of microservice chain, the service mesh control plane 505 observes the degree of timeout transaction between M1 to M2 is below 2% at the current timeout configuration, then policy optimizer 550 may decrease the timeout value of the timeout configuration and push the updated network policy comprising the revised timeout configuration to the proxies 527 of the microservice chain. In an alternative scenario, there is a timeout configuration between microservices M1 and M2 and a maximum timeout threshold rate of 25%. If upon observation by the service mesh control plane 505 tracking timeouts by the microservice chain that transactions from incoming API calls 607 are timing out at a rate above the 25% threshold rate, policy optimizer 550 may automatically increase the timeout value within the timeout configuration and push an updated network policy comprising the increased timeout value to one or more proxies 527 of the microservice chain.

In some embodiments, service mesh control plane 505 may track resource usage of the service mesh 511 and microservice chains thereof, alongside incidents of API calls timing out. While tracking transactional timeouts and resource utilization, such as CPU, memory and storage, service mesh control plane 505 can track and identify timeouts that occur as a result of high resource utilization (i.e., resources being consumed above an average or median level for transactions executed by the same API call and/or microservice chain). For transactions that are timing out with resource utilization above a particular level, for example, above 10%, 25%, 50%, etc., service mesh control plane 505 may auto-scale the microservices of the microservice chains experiencing timeouts due to high resource utilization. For example, service mesh control plane 505 may replicate one or more microservices 525 of one or more microservice chain and/or provision additional resources to microservices 525 of a microservice chain experiencing timeouts due to an elevated level of resource usage above a threshold level.

In some embodiments policy optimizer 550 may set a new retry count automatically based on the timeouts observed by the service mesh control plane 505. For instance, if a certain number of microservices are calling another microservice 525 within a microservice chain, and the microservice being called are timing out when a particular API call is being placed, the service mesh control plane can track how many retry attempts are being made to successfully complete the call to the microservice 525. Embodiments of the service mesh control plane 505 may observe that certain API calls being sent to a particular microservice are successful after a set number of retry attempts (i.e., M number of retries). As a result, any new microservice attempting to call the particular microservice using the API call known to be successful after M number of retries may be automatically configured to a retry count of M as part of the network policy and pushed to the proxies 527. For example, referring to FIG. 6, if microservice M2 is timing out during a particular API call, but succeeding after at least 10 retries, then any new microservice, such as M1, trying to call M2, the retry counts of the network policy may be configured to at least 10 retries automatically by the policy optimizer 550 and the network policy can be pushed to proxies P1 and/or P2 for enforcement.

Embodiments of policy optimizer 550 may also configure the service mesh 511 by automatically applying rate limiting adjustments between microservices 525 of the service mesh 511. Service mesh control plane 505 may continuously track rate limits 522 applied to transactions and API calls by microservice chains and set network policies based on rate limiting activities. By tracking transactions and API calls executed on the service mesh 511 by particular user profiles or userIDs, service mesh control plane 505 can predict which microservice chains might be called by specific API calls. For example, if an incoming API call 607 to microservice M1 by a particular user profile, the service mesh control plane can predict that the API call 607 will invoke the microservice chain M1 to M5 as shown in FIG. 6.

Moreover, in situations where an API call 607 is rate limited for all users (i.e., a global rate limit) to a particular microservice (i.e., such as microservice M5) then policy optimizer 550 can pre-emptively apply the rate limit to all API calls and transactions attempting to reach the rate limited microservice. For example, in a situation where microservice M5 is globally rate-limited, any API calls trying to reach microservice M5 will be rate limited as well. For instance, the same rate limit applied to M5 will be pushed by the policy optimizer 550 to all microservice of microservice chain M1 to M5, including M1, M2, M3 and M4 for specific users' profiles. Moreover, if all calls to microservice M5 are rate limited, all microservice chains for all users can be rate limited by the policy optimizer 550 when an endpoint microservice, such as M5, are the target of the API call 607.

In some embodiments, policy optimizer 550 may further apply rate limits to microservices downstream of the rate limited microservice. For example, if a microservice chain comprising microservice M1 to M5, and M3 is rate limited to a specific number of calls per second (i.e., N calls per second), then if the rate limit of M4 and M5 is less than the N calls per second rate limit applied to M3 (for specific users) then M4 and M5 which are downstream from M3 in the microservice chain will also be rate limited to the same N calls per second rate limit. Furthermore, in some embodiments, policy optimizer 550 may enforce rate limits 522 on specific users. For example, if a user 601 is rate limited at a plurality of microservice chains and API calls 607 on a service mesh 511, policy optimizer 550 may apply a user-level rate limit for all API calls 607 originating from user 601. For example, policy optimizer 550 may apply the user level rate limit at the ingress of the API gateway 605 and control the rate at which all API calls from the user 601 are sent from the API gateway 605 to the first microservice 525 or proxy 527 thereof in the microservice chain being invoked. In some embodiments, service mesh control plane 505 may also limit users on a service mesh wide basis by migrating heavy users of the service mesh 511 to a subsection of the service mesh 511. For example, to keep problematic users from monopolizing service mesh 511 resources and microservice chains, all API calls from a user to the service mesh may be specifically handed by microservice chains within the subsection of the service mesh 511, while remaining users outside of the subsection may user a separate set of microservice chains to fulfill requests.

Method for Managing and Optimizing Network Policies Between Microservices within a Service Mesh The drawings of FIGS. 7-10 represent embodiments of methods for implementing a service mesh 511 capable of dynamically managing and optimizing network policies between microservices 525, in accordance with FIGS. 3-6 described above, using one or more computing systems defined generically by computing system 100 of FIGS. 1-2; and more specifically by the embodiments of specialized systems depicted in FIGS. 3-6 and as described herein. A person skilled in the art should recognize that the steps of the method described in FIGS. 7-10 may be performed in a different order than presented and may not require all the steps described herein to be performed.

Figure 7:
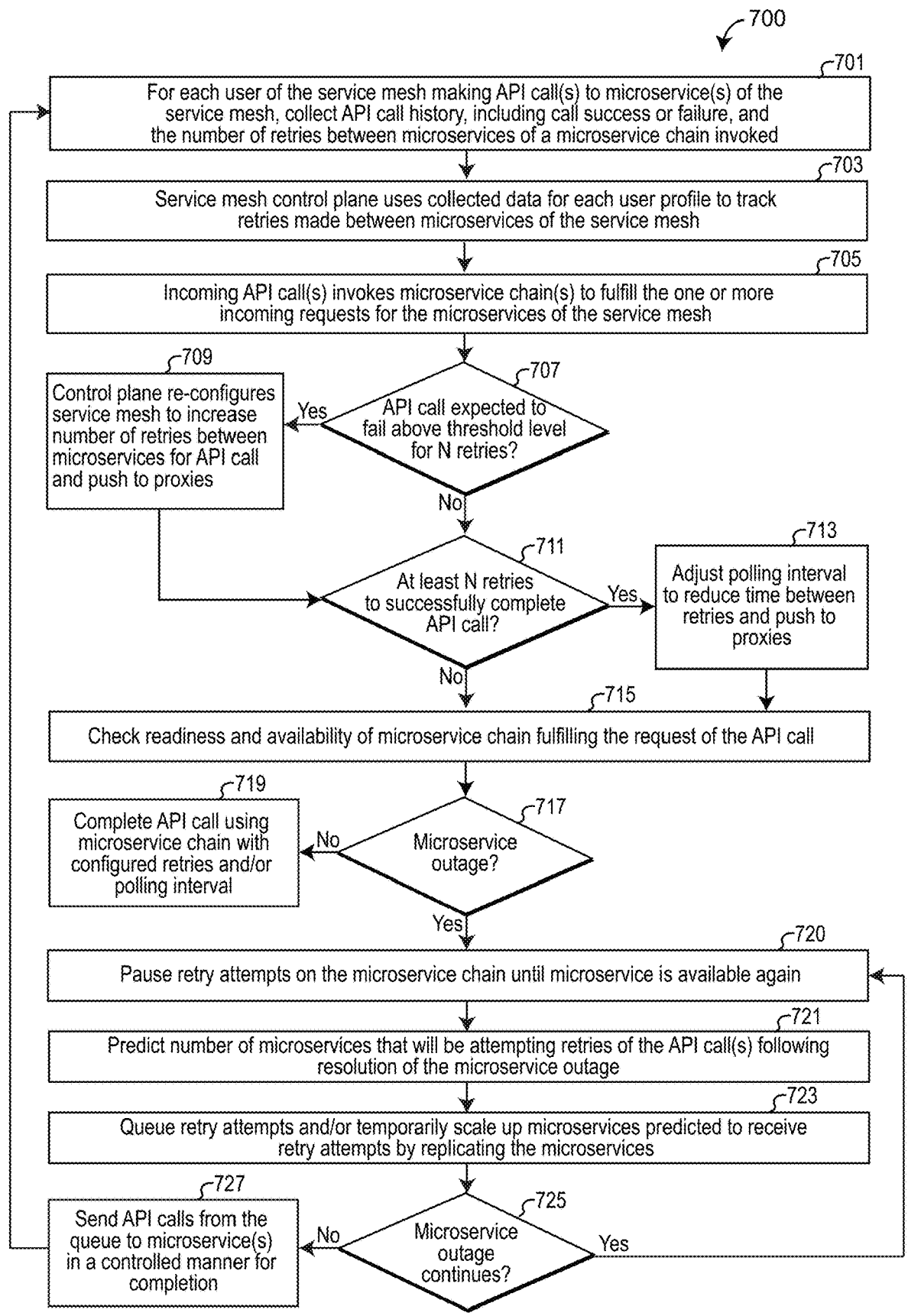
FIG. 7 depicts a flow diagram describing an embodiment of a method for dynamically managing and optimizing network policies between microservices of a service mesh based on automatic retries between microservices, in accordance with the present disclosure.

The embodiment of method 700 described by FIG. 7 may begin at step 701. During step 701, for each user of the service mesh making API call(s) to one or more microservice(s) of the service mesh, the service mesh collects metrics and data describing the transactions and context surrounding the API call, including historical information describing the API call history, the call successes and/or failures, and/or the number of retries being performed by the proxies as communications of the invoked microservice chain are routed from one microservice to the next microservice. In step 703, embodiments of the micro service control plane may use the collected data describing the API call histories for each user profile to track the number of retries (i.e., the retry count) between the different microservices of the service mesh for each of the API calls historically made to the service mesh.

In step 705, of method 700, one or more incoming API call(s) may be transmitted to the service mesh, invoking one or more microservice chains to fulfill the incoming request for microservices. Based on the previously collected metrics and data describing historical API calls and the number of retries being tracked by the service mesh control plane for each particular API call received by the service mesh, the service mesh control plane may predict a likelihood of completing the incoming API call using the requested microservice chain in view of the current retry count set by the service mesh. In step 707, the service mesh control plane may decide whether or not the API call being received is expected to fail at a rate above a threshold level for the current retry count (i.e., N number of retries). If the expected failure rate of the incoming API for the current retry count is above a threshold level of failure set by the service mesh, the method 700 may proceed to step 709, otherwise the method may proceed to step 711. For example, if at the current retry count set by the service mesh is known based on the history of the same or similar API calls being executed by the microservice chain being invoked to fail at a rate of 90% at the current retry count, and the 90% failure rate is above a threshold level configured by the service mesh, the method 700 may proceed to step 709 in order to adjust the retry count and improve the failure rate. In step 709, the service mesh control plane may reconfigure service mesh network policies by increasing the retry count, increasing the number of retries between the microservices for the type of incoming API call being received. Upon re-configuring the network policy for the retry count for the type of the incoming API call, the method may proceed to step 711.

In step 711, the service mesh control plane of the service mesh can further determine whether, based on the history of API calls being tracked by the service mesh, the incoming API call is expected or known to need at least a certain number of retries set by the retry count to successfully complete the API call using microservices of the microservice chain being invoked. If at least a certain number of retries are known to be needed by the proxies to successfully communicate between the microservices of the microservice chain, the method 700 may proceed to step 713, wherein the service mesh control plane can configure the network policy of the service mesh by adjusting the polling interval between retries of the API call. For instance, by reducing the polling interval between retries, reducing the amount of time between re-trying to execute the API call on a microservice, allowing retries to happen more quickly instead of waiting for a longer period of time before re-trying the API call. Once the polling interval of the network policy is adjusted, the updated network policy can be pushed to the proxies of the service mesh. Conversely, if during step 711 the service mesh control plane determines that at least a certain number of retries (N) as set by the retry count are not needed to successfully complete the incoming API call, the method 700 may proceed to step 715.

During step 715, the service mesh may check the readiness and availability of the microservices of the microservice chain being invoked to fulfill the request of the incoming API call. In step 717, a determination of one or more microservice's readiness to complete the API call is made.

If there is not a microservice outage at one or more microservices of the microservice chain being invoked, the method may proceed to step 719, wherein the API call is completed using the requested microservice chain of the API call, along with the configured retries and/or polling interval of the proxies as established by the most recent network policy configurations. Conversely, if during step 717, a microservice outage is identified at one or more microservices of the microservice chain as a result of the readiness or availability check, the method 700 may proceed to step 720. During step 720, the service mesh may pause attempts to retry API call(s) on microservice chains experiencing one or more microservices that are unavailable or unready to fulfill the API call.

During step 721 of method 700, embodiments of the service mesh may predict a number of microservices that will be attempting to retry one or more API calls on the microservice chain experiencing the microservice outage once the microservice out has been resolved. If the service mesh predicts an amount of retry attempts are expected that may be difficult for the service mesh to handle all at once or would result in an increased load on the service mesh, the service mesh may, in step 723, use a queue to ensure that each of the microservices predicted to perform a retry attempt on the microservice chain, once retry attempts are resumed by the service mesh. The service mesh may queue retry attempts being requested by microservices (and/or proxies thereof) in a message queue, wherein retry attempts being queued can be submitted to the microservices in a controlled manner, avoiding a flood of retry attempts all at once and/or increased load requirements to handle the sudden uptick of retry attempts being requested. Moreover, in some embodiments, based on the number of microservices predicted to receive a retry attempt on the microservice chain, the service mesh may temporarily increase the service mesh's ability to handle the sudden influx of retry attempts once the microservice outage ends, by temporarily scaling up the number of microservices in the microservice chain to process the API calls. For example, scaling up microservices may include replicating one or more microservices of the microservice chain, provisioning computing resources to the replicas of the microservices and/or increasing computing resources to the microservices in anticipation of the predicted influx of retry attempts once the microservice outage is over.

In step 725, a determination is made whether or not the microservice outage at one or more microservices of the microservice chain continues. If the microservice outage continues, the method 700 may return to step 719 whereby the method 700 continues to pause retry attempts on the microservice chain. Moreover, if in step 725, there is a determination that the microservice outage is over, the method may proceed to step 727. During step 727, retry attempts by the microservices of the microservice chain previously paused may proceed. In situations where a queue was used to queue up retry attempts in a message queue, the API calls may be released and routed from the queue to their microservice(s) destination in a controlled manner that does not overwhelm the microservices (and replicas thereof). Moreover, a load balancer may help control the distribution of the API calls between microservices and replicas thereof, in order to prevent a single microservice or replica from receiving too many retry attempts all at once.

Figure 8:
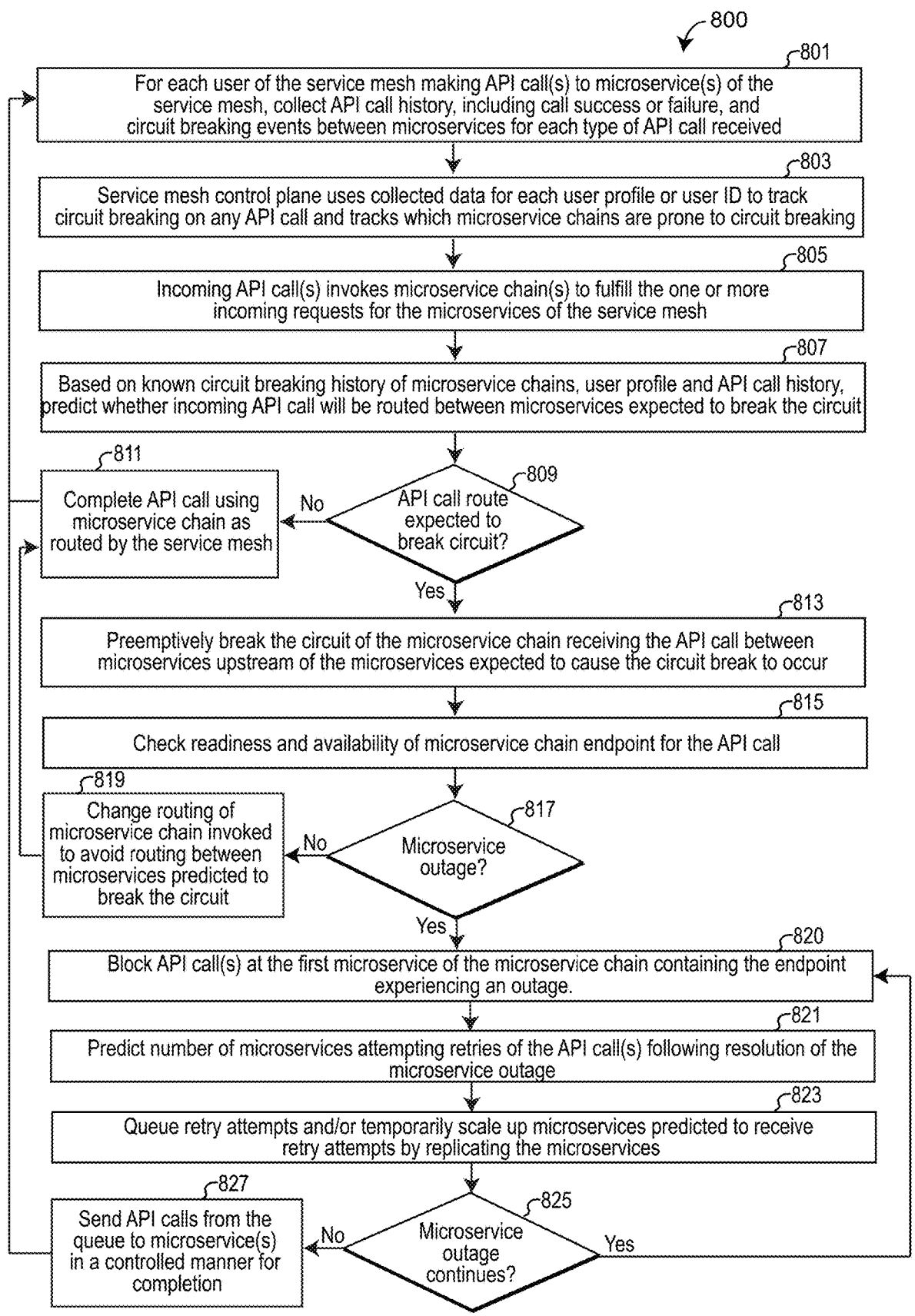
FIG. 8 depicts a flow diagram describing an embodiment of a method for dynamically managing and optimizing network policies between microservices of a service mesh based on automated circuit breaking between microservices in a microservice chain within a service mesh in accordance with the present disclosure.

FIG. 8 describes an embodiment of a method 800 for optimizing network policies between microservices of a service mesh. Embodiments of method 800 may begin at step 801. At step 801, the occurrence of any circuit breaking events being performed by the proxies as communications of the invoked microservice chain are routed from one microservice to the next microservice. In step 803, embodiments of the micro service control plane may use the collected data describing the API call histories for each user profile to track the circuit breaking events (i.e., the circuit breakers) between the different microservices of the service mesh for each of the API calls historically made to the service mesh.

In step 805 of method 800, one or more incoming API call(s) may be transmitted to the service mesh. The incoming API call(s) invoke one or more microservice chains to fulfill the incoming request for microservices. In step 807, embodiments of the service mesh control plane may predict, based on known circuit breaking history of microservice chains being invoked by the incoming API call(s), user profile and historical API call history, whether the incoming API call being routed between one or more microservices of the microservice chain is expected to break the circuit of the microservice chain as well as calculate the likelihood that one or more of the microservices known to cause a break in the circuit will receive the API call. In step 809, a determination is made using the prediction in step 807, whether or not the routing of the API call to microservices of the microservice chain is expected to break the circuit. If in step 809, the circuit is not expected to be broken based on the anticipated routing of the API call, method 800 may proceed to step 811, wherein the service mesh will complete the call using the microservice chain requested.

If in step 809 the service mesh determines that the route of the API call is expected to break the circuit between a first microservice and a second microservice of the microservice chain, the method 800 may proceed to step 813. During step 813, in response to the expectation that a circuit breaking event may occur between the first microservice and the second microservice of the microservice chain, the service mesh may pre-emptively break the circuit of the microservice chain upstream in the microservice chain, at a third microservice expected to be routed the API call before it reaches the first microservice and/or the second microservice. Wherein the first microservice is at the start of the microservice chain, the pre-emptive circuit breaking of the microservice chain may occur at the first microservice. In step 815 of method 800, the service mesh may check the readiness and availability of the microservice chain at the endpoint microservice for the transaction being requested by the API call. Based on the readiness check performed at the endpoint microservice of microservice chain, a determination can be made in step 817 whether or not there is a microservice outage at the endpoint microservice. If the endpoint microservice is ready and available to complete the API call, the method may proceed to step 819. During step 819, the service mesh control plane may change the routing of the API call to an alternative microservice chain. By changing the routing, the microservices predicted to cause a circuit breaking event can be avoided while still allowing the ready and available endpoint microservice to complete the transaction of the API call. Once routing of the API has been changed to an alternate microservice chain that avoids the microservices predicted to cause the circuit breaking event, the API call can be completed using the alternative microservice chain, and results thereof can be recorded by the service mesh.

Alternatively, if a determination is made in step 817 that based on the readiness check that the microservice endpoint is not available to complete the transaction invoked by the API call, the method 800 may proceed to step 820. At step 820, the service mesh control plane may block the API calls from being executed at the beginning of the microservice chain containing the unavailable endpoint microservice. For example, if a microservice chain comprises microservices M1 to M2 to M3 to M4 to M5, and microservice M3 to M4 is predicted to cause a circuit breaking event for an API call with reasonable accuracy, the service mesh control plan may preemptively break the circuit at an upstream microservice such as M1 or M2. Moreover, if the endpoint microservice M5 is identified as being unavailable, the service mesh control plane may block the API call execution at the first microservice (M1) residing at the start of the microservice chain; saving unnecessary usage of resources that may be impacted by partially completing the API call along the microservice chain up to a point where the circuit breaking event occurs.

As a result of blocking the API call at the first microservice at the start of the microservice chain, a plurality of attempts to retry the API call once the block is removed upon the endpoint microservice becoming available and/or ready. In step 821 of method 800, the service mesh may predict a number of microservices expected to retry the API call. If the predicted number of retries is expected to create a heavy load on the microservices of the microservice chain, the service mesh may, in step 823, query retry attempts in a message queue and/or temporarily scale up microservices predicted to receive the retry attempts by creating new replicas of the microservices, in order to balance out the demand for microservices across the existing microservices and replicas thereof. Moreover, either in conjunction with replication of the microservice and/or queuing of retry attempts, the temporary scale up of microservices may also include temporarily increasing the number of provisioned resources to the microservice, increasing the capability of the scaled up microservices to handle the increased load due to the high volume of API call retry attempts following the resumption of services by the endpoint microservice.

In step 825, determination is made whether or not the microservice outage at the endpoint microservice continues. If in step 825, there is a determination that the microservice outage is over, the method may proceed to step 827. During step 827, retry attempts by the microservices of the microservice chain previously blocked at the beginning of the microservice chain may proceed. In situations where a queue was used to queue up retry attempts in a message queue, the API calls may be released and routed from the queue to their microservice(s) destination in a controlled manner that does not overwhelm the microservices (and replicas thereof). Moreover, a load balancer may help control the distribution of the API calls between microservices and replicas thereof, in order to prevent a single microservice or replica from receiving too many retry attempts all at once.

Figure 9:
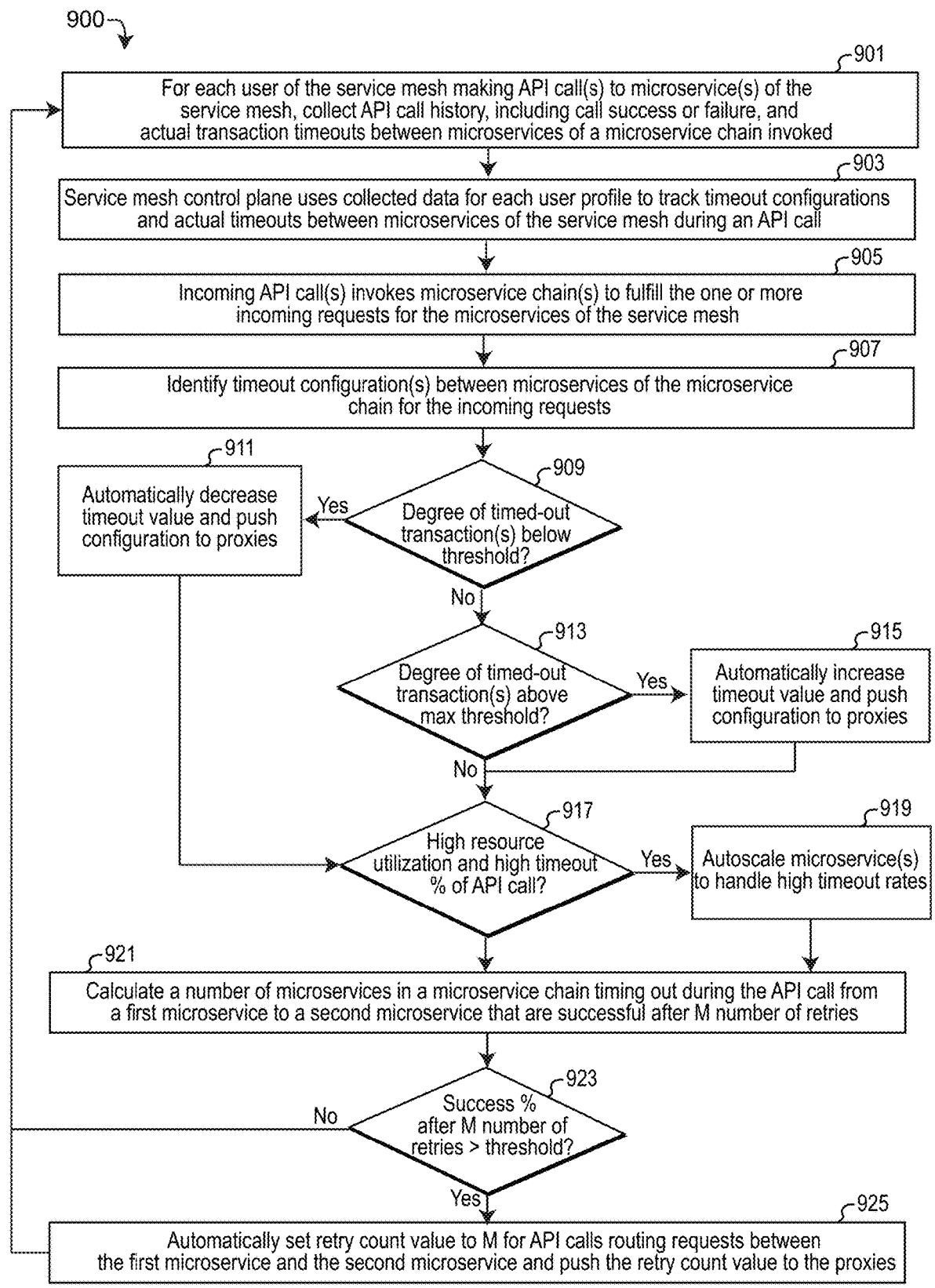
FIG. 9 depicts a flow diagram describing an embodiment of a method for dynamically managing and optimizing network policies between microservices of a service mesh based on automated time out adjustments between microservices within a service mesh, in accordance with the present disclosure.

FIG. 9 describes an embodiment of a method 900 for optimizing network policies between microservices of a service mesh. Embodiments of method 900 may begin at step 901. During step 901, the service mesh collects for each user making API calls to the microservices, service mesh metrics and metrics describing transactions and the context surrounding the API calls being executed. The data and contextual information collected by the service mesh can include historical information describing the history of API calls executed by the service mesh, the success and/or failures of each API call, and actual transaction timeouts between microservices of the microservice chain invoked by the API call(s). In step 903, embodiments of the microservice control plane may use the collected data describing the API call histories for each user profile to track the timeout configurations of the service mesh and the corresponding occurrences of actual timeouts between the different microservices of the service mesh for each of the API calls historically made to the service mesh, for each timeout configuration.

In step 905, one or more incoming API call(s) may be transmitted to the service mesh from an application, for example via an application UI or CLI. The incoming API call(s) may invoke one or more microservice chains to fulfill the incoming request for microservices. In step 907, the service mesh control plane identifies the microservice chain known to be invoked by the incoming API call(s) based on the history of API calls and knowing the most likely microservices to execute the API call(s) as part of the microservice chain, the service mesh control plane identifies timeout configurations between the microservices of the microservice chain handling the incoming call. In step 909, the service mesh control plane calculates the rate at which the microservices of the microservice chain are expected to timeout at the current timeout configuration while handling the API call and compare the timeout rate for the transaction of the incoming API call with a configured threshold. If the timeout rate is below the configured threshold, the method 900 may proceed to step 911. During step 911, the service mesh control plane may re-configure the network policy for the timeout value by decreasing the timeout value. As a result of decreasing the timeout value, timeouts may occur more quickly, enabling to proxies of the service mesh to spend less time waiting for API calls timeout before retrying the API call or sending an error. The service mesh control plane can push the updated network policy comprising the update to the timeout value to the proxies of the microservice chain.

Furthermore, with regard to step 909, if the rate at which transactions timeout between the microservices of the microservice chain at the current timeout configuration is above a threshold timeout rate, the method may proceed to step 913 to further analyze whether the rate at which transactions timeout between the microservices is above a maximum threshold allowed by the network policies as set by the service mesh control plane. If the timeout rate is above the maximum threshold, the method 900 may proceed to step 915. During step 915, the service mesh control plane may re-configure the network policy by automatically increasing the timeout value between the microservice and push the updated network policy to the proxies for the microservices of the microservice chain. By increasing the timeout value, the proxies will wait longer for the API call to complete and reduce the number of failures occurring due to the API call timing out prematurely where the API call could have successfully completed if provided more time to complete the API call. Conversely, if the timeout rate is not above the maximum threshold value set by the network policy configurations, the method 900 may proceed to step 917.

In step 917, the service mesh control plane may determine whether the transaction timeouts recorded and tracked by the service mesh experienced high resource utilization (i.e., CPU, memory, storage, etc.). For example, by comparing resource utilization for timed out transactions and the number of transactions timed out while consuming a high level of resources. If resource utilization is considered high (i.e., above a threshold level of resources) for a threshold percentage of the timed-out transactions executed by the microservices of the microservice chain being invoked, then the method 900 may proceed to step 919. During step 919, the service mesh may auto scale the microservices of the microservice chain to handle the high timeout rates and load experienced by the volume of API calls resulting in timeouts. For example, autoscaling may replicate microservices of the microservice chain, allowing load balancing to occur whereby API calls requesting the microservices can be distributed to less busy microservices or replicas thereof. Moreover, the service mesh may auto scale the number of resources provisioned to the microservices experiencing high resource utilization and high timeout rates. For instance, by increasing resources provided to the microservices (either temporarily or permanently), in order to handle the amount of API calls being received.

In step 921 of the method 900, the service mesh control plane may use the collected data from each user profile collected in step 903 to calculate a number of microservices within the microservice chain timing out during an API call between a first microservice and a second microservice but are identified as being a successful API call after a set number of retries (M number of retries) configured by the network policy of the service mesh. In step 923, a comparison can be made between the successful percentage of API calls after M number of retries against a threshold success rate established by the service mesh. If the success rate of API calls is greater than the threshold rate of success, the method 900 may proceed to step 925, wherein the service mesh control plane automatically set the retry count value to the M number of retries in the network policy for API calls between the first microservice and the second microservice. The updated network policy can be pushed to the proxy of the first microservice. Moreover, in some embodiments, any new API calls that may be routed from the first microservice to the second microservice, may also be set to perform the number of retries M as established by the network policy pushed to the proxy. For example, if the service mesh is tracking the success rate of API calls after 10 retries between a first microservice M1 and a second microservice M2. If, the success rate is known from historical API calls to be 90% success after 10 retries, and the threshold level for success is a rate of 75%, then the service mesh control plane may automatically set the number of retries for any incoming API calls routed from M1 and M2 to conduct at least 10 retries before failure occurs.

Figure 10:
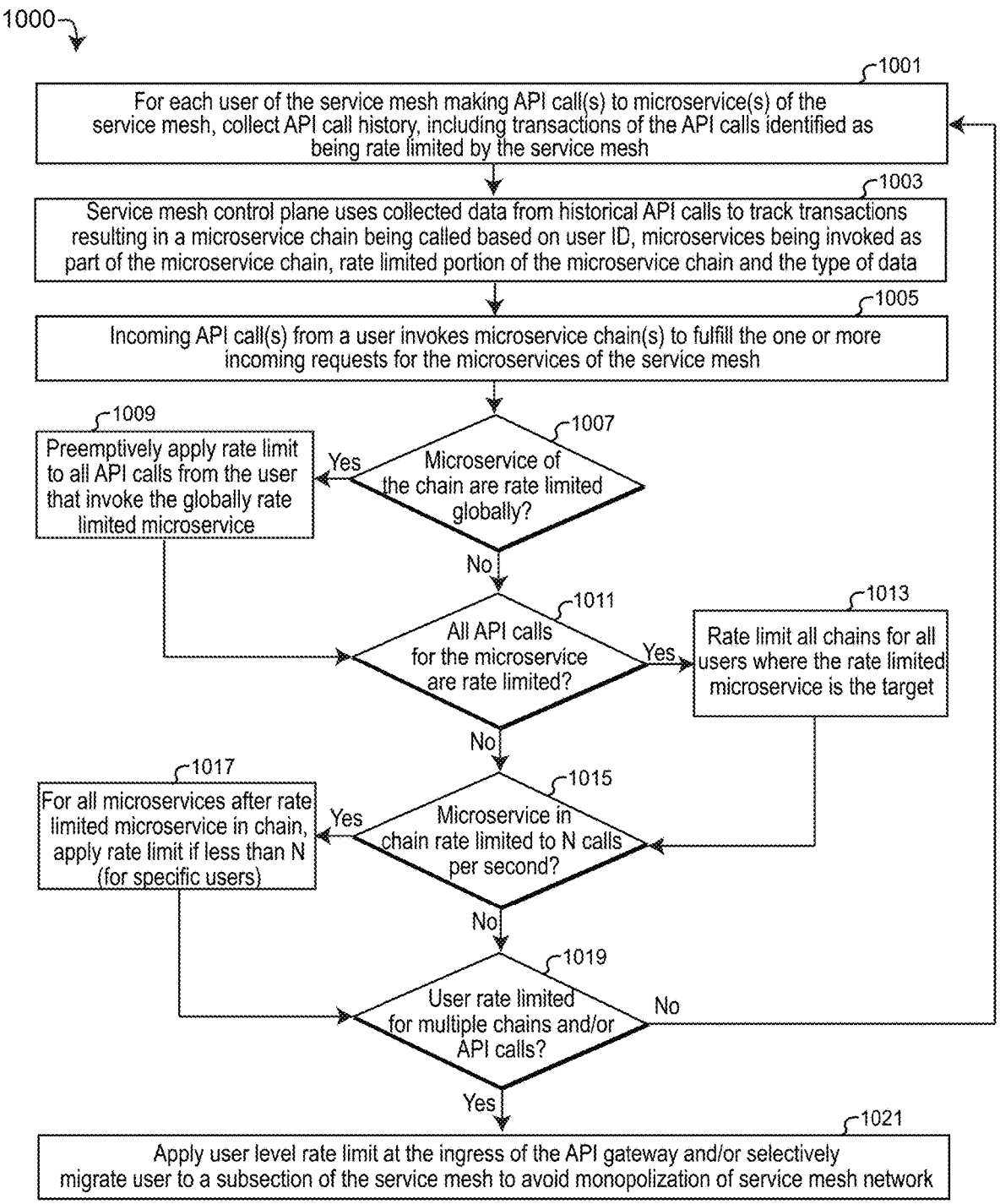
FIG. 10 depicts a flow diagram describing an embodiment of a method for dynamically managing and optimizing network policies between microservices of a service mesh based on automated rate limit adjustments between microservices within a service mesh, in accordance with the present disclosure.

FIG. 10 describes an embodiment of a method 800 for optimizing network policies between microservices of a service mesh. Embodiments of the method may begin at step 1001. During step 1001, for each user of the service mesh making API call(s) to one or more microservice(s) of the service mesh, the service mesh collects metrics and data describing the transactions and context surrounding the API calls being executed, including historical information describing the API call history, the call successes and/or failures, and/or API calls identified as being rate limited by the service mesh. In step 1003, embodiments of the microservice control plane may use the collected data describing the API call histories for each user profile to track the transactions resulting in a microservice chain being called based on user ID or user profile, the microservices invoked as part of the microservice chain, one or more rate-limited portions of the microservice chain and the type of data being transferred through the microservice chain. As a result of tracking the transactions over time, the service mesh control plane can accurately predict which microservices are invoked as part of microservice chains for particular API calls.

In step 1005, incoming API call(s) is received from a user(s) invoking a microservice chain to fulfill one or more of the incoming requests of the API call. The service mesh control plan can predict which microservices are being invoked as part of the microservice chains known to handle the incoming API call(s) based on tracking information from step 1003. Using the tracking information, in step 1007, the service mesh control plane may determine whether or not a microservice of the microservice chain being invoked by the incoming API call subject to a global rate limit (i.e., rate limiting for all users of the service mesh). If the microservice that is part of the invoked micro service chain is globally rate limited, the method 1000 may proceed to step 1009, wherein the service mesh control plane may preemptively apply the rate limit to all API calls that may reach the rate-limited microservices of the microservice chain based on user. For example, if a microservice chain comprises microservice M1 to M2 to M3 to M4 to M5, and M5 is the globally rate-limited microservice for all users, then if a user submits an API call that invokes the microservice chain that will reach M5, the rate limit of M5 will be pushed to all microservices up the chain (i.e., M1, M2, M3 and M4). Conversely, if a microservice within the microservice chain being invoked is not globally rate limited, the method 1000 may proceed to step 1011.

In step 1011, the service mesh control plan may use the tracking information of step 1003 to further determine whether or not all API calls for a particular microservice are rate limited. If all API calls for a particular microservice are rate limited, then the method may proceed to step 1013, wherein the service mesh control plan may configure a network policy that rate limits all microservice chains, for all users, where the rate-limited microservice is targeted by the API call. For example, if a microservice M5 is rate limited for all API calls and is part of a microservice chain comprising M1 to M2 to M3 to M4 to M5 and a separate microservice chain M1 to M2 to M5, since both chains target M5, any API calls invoking either the M1 to M5 chain or the M1 to M2 to M5 chain will be rate limited at all microservices of the chain. If, however, in step 1011 the service mesh control plane determines that all API calls for a particular microservice are not all rate-limited, the method may proceed to step 1015.

During step 1015, the service mesh control plane may further assess whether or not a microservice within a microservice chain to a number of API calls (N) per second or less for specific users. If a microservice within the microservice chain being invoked by the incoming API call is rate limited to N calls per second or less for the user submitting the API call, then the method 1000 may proceed to step 1017, wherein for all microservices that follow the rate limited microservice in the microservice chain, each of the subsequent microservices in the chain will have the rate limit applied. For example, if in a microservice chain M1 to M5, M3 is rate limited to N calls per second or less, then if the chain is invoked by an API call submitted by a specific user that is subject to the rate limitation of M3, then for the API call M4 and M5 will be rate limited to N calls per second (or less) since M4 and M4 follow M3 in the chain being invoked. Moreover, if in step 1015 a microservice within the invoked microservice chain is not rate limited to a set number of API calls per second, the method 1000 may proceed to step 1019 from step 1015 without imposing the limits as discussed in step 1017.

In step 1019, the service mesh control plane may assess whether the user submitting the incoming API call from step 1005 is rate limited by the service mesh for multiple microservice chains and/or multiple API calls accepted by the service mesh. If the user submitting the API call is rate limited for multiple chains and/or multiple API calls, the service mesh control plane may, in step 1021 configure the network policy to apply a user-level rate limit on the user's submission of API calls. For example, the user-level rate limit may be pushed to the ingress of API calls by the API gateway in some embodiments. In some embodiments, the service mesh control plane may also selectively migrate the specific user(s) to a subsection of the service mesh. For example, the subsection may include microservices that fulfill API calls at a particular rate limit, a private section of a service mesh that may have dedicated resources and/or resource utilization that does not impact the remaining portion of the service mesh. By placing problematic users or users that make a disproportionate amount of API calls to the service mesh on a subsection of the service mesh, monopolization of the service mesh network by these particular users can be avoided. Preventing remaining users from having a negative experience using the service mesh network.

What is claimed is:

1. A computer-implemented method for optimizing network policies between microservices of a service mesh, the computer-implemented method comprising:
   collecting, by the service mesh, a history of application programming interface (API) calls sent to the service mesh, including within the history of the API calls, a number of retries between microservices of each microservice chain invoked by the API calls;
   tracking, by the service mesh, the number of retries between the microservices for each user profile transmitting one or more of the API calls, based on the history of the API calls to the service mesh;
   receiving, by the service mesh, an incoming API call requesting the microservices of the service mesh, wherein the incoming API call is routed through a microservice chain comprising a first microservice to a second microservice;
   comparing, by the service mesh, a current retry count for communications between the first microservice and the second microservice with a historical success rate recorded by the history of the API calls for the first microservice and the second microservice at the current retry count;
   upon identifying, by the service mesh, that the historical success rate at the current retry count is below a threshold level of success, automatically adjusting the current retry count for communications between the first microservice and the second microservice to increase the number of retries to a retry count predicted to increase a success rate above the threshold level of success; and
   pushing, by the service mesh, a network policy changing the current retry count to an adjusted retry count, to a proxy of the first microservice and a proxy of the second microservice.

2. The computer-implemented method of claim 1, further comprising:
   identifying, by the service mesh, based on the history of API calls sent to the service mesh, that the number of retries to successfully complete the incoming API call is at least equal to the current retry count or the adjusted retry count;
   in response to the identifying the number of retries to successfully complete the incoming API call is at least equal to the current retry count or the adjusted retry count, automatically decreasing, by the service mesh, a polling interval between retries;
   updating, by the service mesh, the network policy to an updated network policy comprising the decrease in the polling interval between retries; and
   pushing, by the service mesh, the updated network policy to the proxy of the first microservice and the proxy of the second microservice.

3. The computer-implemented method of claim 1, further comprising:
   checking, by the service mesh, readiness and availability of the microservice chain to fulfill the incoming API call;
   upon checking the readiness and availability of the microservice chain, determining, by the service mesh, a microservice outage at one or more microservices of the microservice chain; and
   pausing, by the service mesh, all retry attempts on the microservice chain until the microservice chain is available again.

4. The computer-implemented method of claim 3, further comprising:
   predicting, by the service mesh, a number of micro services attempting retries of the incoming API call;
   queuing, by the service mesh, retry attempts in a queue while the microservice chain is unavailable during the microservice outage; and
   upon the microservice chain becoming available, executing the retry attempts stored in the queue in a controlled manner on the microservice chain, preventing simultaneous execution of all retry attempts stored in the queue.

5. The computer-implemented method of claim 3 further comprising:
   predicting, by the service mesh, a number of micro services attempting retries of the incoming API call;
   replicating, by the service mesh, the first microservice, the second microservice and a combination thereof in response to the number of microservices predicted to be attempting retries of the incoming API call; and
   upon the microservice chain becoming available again, load balancing all of the retry attempts amongst the first microservice or the second microservice and replicas thereof.

6. The computer-implemented method of claim 1, further comprising:
   collecting, by the service mesh, as part of the history of API calls sent to the service mesh, circuit breaking events between the microservices for each microservice chain invoked by the API calls of the history of API calls;
   predicting, by the service mesh, whether the incoming API call will be routed between the first microservice and the second microservice, and based on the history of API calls, whether the incoming API call being routed from the first microservice to the second microservice will break a circuit in the microservice chain; and
   upon predicting that routing the incoming API call through the first microservice to the second microservice will break the circuit in the microservice chain, preemptively breaking, by the service mesh, the circuit in the microservice chain at a third microservice upstream from the first microservice and the second microservice.

7. The computer-implemented method of claim 6, further comprising:

checking, by the service mesh, readiness and availability of an endpoint of the microservice chain being invoked to fulfill the incoming API call;

upon checking the readiness and availability of the endpoint of the microservice chain, determining, by the service mesh, a microservice outage at the endpoint of the microservice chain; and blocking, by the service mesh, the incoming API call from executing on a microservice at a beginning of the microservice chain.

8. A computer-implemented method for optimizing network policies between microservices of a service mesh comprising:

collecting, by the service mesh, a history of application programming interface (API) calls sent to the service mesh, including within the history of the API calls, circuit breaking events between microservices of each microservice chain invoked by the API calls;

tracking, by the service mesh, the circuit breaking events between the microservices for each user profile transmitting one or more of the API calls, based on the history of the API calls to the service mesh;

receiving, by the service mesh, an incoming API call requesting the microservices of the service mesh, wherein the incoming API call is routed through a microservice chain comprising a first microservice to a second microservice;

predicting, by the service mesh, whether the incoming API call will be routed between the first microservice and the second microservice, and based on the history of API calls, whether the incoming API call being routed from the first microservice to the second microservice will break a circuit in the microservice chain; and upon predicting that routing the incoming API call through the first microservice to the second microservice will break the circuit in the microservice chain, preemptively breaking, by the service mesh, the circuit in the microservice chain at a third microservice upstream from the first microservice and the second microservice.

9. The computer-implemented method of claim 8, further comprising:

checking, by the service mesh, readiness and availability of an endpoint of the microservice chain being invoked to fulfill the incoming API call;

upon checking the readiness and availability of the endpoint of the microservice chain, determining, by the service mesh, a microservice outage at the endpoint of the microservice chain; and blocking, by the service mesh, the incoming API call from executing on a microservice at a beginning of the microservice chain.

10. The computer-implemented method of claim 9, further comprising:

predicting, by the service mesh, a number of microservices attempting retries of the incoming API call upon resolution of the microservice outage at the endpoint of the microservice chain;

queuing, by the service mesh, retry attempts in a queue while the microservice chain is unavailable during the microservice outage; and upon the microservice chain becoming available, executing the retry attempts stored in the queue in a controlled manner on the microservice chain, preventing simultaneous execution of all retry attempts stored in the queue.

11. The computer-implemented method of claim 9 further comprising:

predicting, by the service mesh, a number of microservices attempting retries of the incoming API call upon resolution of the microservice outage at the endpoint of the microservice chain;

replicating, by the service mesh, one or more microservices of the microservice chain in response to the number of microservices predicted to be attempting retries of the incoming API call; and upon the microservice chain becoming available, load balancing all of the retry attempts amongst the one or more microservices of the microservice chain and replicas thereof.

12. The computer-implemented method of claim 8, further comprising:

collecting, by the service mesh, as part of the history of API calls sent to the service mesh, a number of retries between the microservices of each microservice chain invoked by the API calls;

comparing, by the service mesh, a current retry count for communications between the first microservice and the second microservice with a historical success rate recorded by the history of the API calls for the first microservice and the second microservice at the current retry count; and upon identifying, by the service mesh, that the historical success rate at the current retry count is below a threshold level of success, automatically adjusting the current retry count for communications between the first microservice and the second microservice to increase the number of retries to a retry count predicted to increase a success rate above the threshold level of success.

13. The computer-implemented method of claim 12, further comprising:

identifying, by the service mesh, based on the history of API calls sent to the service mesh, that the number of retries to successfully complete the incoming API call is at least equal to the current retry count or the adjusted retry count;

in response to the identifying the number of retries to successfully complete the incoming API call is at least equal to the current retry count or the adjusted retry count, automatically decreasing, by the service mesh, a polling interval between retries; and updating, by the service mesh, the network policy to an updated network policy comprising the decrease in the polling interval between retries.

14. The computer-implemented method of claim 12, further comprising:

checking, by the service mesh, readiness and availability of the microservice chain to fulfill the incoming API call;

upon checking the readiness and availability of the microservice chain, determining, by the service mesh, that the microservice outage is present at one or more microservices of the microservice chain; and pausing, by the service mesh, all retry attempts on the microservice chain until the microservice chain is available again.

15. A computer program product for optimizing network policies between microservices of a service mesh comprising:

one or more computer readable storage media having computer-readable program instructions stored on the one or more computer readable storage media, said program instructions executes a computer-implemented method comprising:

collecting, by the service mesh, a history of application programming interface (API) calls sent to the service mesh, including within the history of the API calls, a number of retries between microservices of each microservice chain invoked by the API calls;

tracking, by the service mesh, the number of retries between the microservices for each user profile transmitting one or more of the API calls, based on the history of the API calls to the service mesh;

receiving, by the service mesh, an incoming API call requesting the microservices of the service mesh, wherein the incoming API call is routed through a microservice chain comprising a first microservice to a second microservice;

comparing, by the service mesh, a current retry count for communications between the first microservice and the second microservice with a historical success rate recorded by the history of the API calls for the first microservice and the second microservice at the current retry count;

upon identifying, by the service mesh, that the historical success rate at the current retry count is below a threshold level of success, automatically adjusting the current retry count for communications between the first microservice and the second microservice to increase the number of retries to a retry count predicted to increase a success rate above the threshold level of success; and pushing, by the service mesh, a network policy changing the current retry count to an adjusted retry count, to a proxy of the first microservice and a proxy of the second microservice.

16. The computer program product of claim 15, further comprising:

identifying, by the service mesh, based on the history of API calls sent to the service mesh, that the number of retries to successfully complete the incoming API call is at least equal to the current retry count or the adjusted retry count;

in response to the identifying the number of retries to successfully complete the incoming API call is at least equal to the current retry count or the adjusted retry count, automatically decreasing, by the service mesh, a polling interval between retries;

updating, by the service mesh, the network policy to an updated network policy comprising the decrease in the polling interval between retries; and pushing, by the service mesh, the updated network policy to the proxy of the first microservice and the proxy of the second microservice.

17. The computer program product of claim 15, further comprising:

checking, by the service mesh, readiness and availability of the microservice chain to fulfill the incoming API call;

upon checking the readiness and availability of the microservice chain, determining, by the service mesh, a microservice outage at one or more microservices of the microservice chain; and pausing, by the service mesh, all retry attempts on the microservice chain until the microservice chain is available again.

18. The computer program product of claim 17, further comprising:

predicting, by the service mesh, a number of microservices attempting retries of the incoming API call;

queuing, by the service mesh, retry attempts in a queue while the microservice chain is unavailable during the microservice outage; and upon the microservice chain becoming available, executing the retry attempts stored in the queue in a controlled manner on the microservice chain, preventing simultaneous execution of all retry attempts stored in the queue.

19. The computer program product of claim 15, further comprising:

collecting, by the service mesh, as part of the history of API calls sent to the service mesh, circuit breaking events between the microservices for each microservice chain invoked by the API calls of the history of API calls;

predicting, by the service mesh, whether the incoming API call will be routed between the first microservice and the second microservice, and based on the history of API calls, whether the incoming API call being routed from the first microservice to the second microservice will break a circuit in the microservice chain; and upon predicting that routing the incoming API call through the first microservice to the second microservice will break the circuit in the microservice chain, preemptively breaking, by the service mesh, the circuit in the microservice chain at a third microservice upstream from the first microservice and the second microservice.

20. The computer program product of claim 19, further comprising:

checking, by the service mesh, readiness and availability of an endpoint of the microservice chain being invoked to fulfill the incoming API call;

upon checking the readiness and availability of the endpoint of the microservice chain, determining, by the service mesh, a microservice outage at the endpoint of the microservice chain; and blocking, by the service mesh, the incoming API call from executing on a microservice at a beginning of the microservice chain.

* * * * *